(12) United States Patent
Misaka

(10) Patent No.: US 6,710,931 B1
(45) Date of Patent: Mar. 23, 2004

(54) ZOOM LENS, AND IMAGE PICKUP APPARATUS AND IMAGE PROJECTION APPARATUS USING THE SAME

(75) Inventor: Makoto Misaka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/576,297

(22) Filed: May 23, 2000

(30) Foreign Application Priority Data

May 26, 1999 (JP) .......................................... 11-146229

(51) Int. Cl.[7] .............................................. G02B 15/14
(52) U.S. Cl. ........................ 359/686; 359/676; 359/683
(58) Field of Search ........................ 359/676, 680–683, 359/686

(56) References Cited

U.S. PATENT DOCUMENTS

| | | | |
|---|---|---|---|
| 4,591,235 A | 5/1986 | Tokumaru et al. | 359/686 |
| 4,653,873 A | 3/1987 | Kawamura | 359/686 |
| 5,000,550 A | 3/1991 | Takahashi et al. | 359/680 |
| 5,132,848 A | 7/1992 | Nishio et al. | 359/686 |
| 5,264,965 A | 11/1993 | Hirakawa | 359/686 |
| 5,329,401 A | 7/1994 | Sato | 359/686 |
| 5,576,890 A | 11/1996 | Tanaka et al. | 359/686 |
| 5,581,404 A | 12/1996 | Misaka et al. | 359/557 |
| 5,585,970 A | 12/1996 | Shibayama | 359/686 |
| 5,691,851 A | 11/1997 | Nishio et al. | 359/683 |
| 5,748,384 A * | 5/1998 | Sensui | 359/686 |
| 5,793,531 A * | 8/1998 | Shibayama | 359/686 |
| 5,805,350 A * | 9/1998 | Yamamoto | 359/686 |
| 5,815,320 A | 9/1998 | Hoshi et al. | 359/686 |
| 5,831,772 A | 11/1998 | Nishio et al. | 359/689 |
| 5,859,729 A | 1/1999 | Misaka | 359/686 |
| 5,963,377 A * | 10/1999 | Okada et al. | 359/686 |
| 6,075,653 A * | 6/2000 | Narimatsu et al. | 359/686 |
| 6,115,188 A | 9/2000 | Nishio et al. | 359/690 |
| 6,236,516 B1 | 5/2001 | Misaka | 359/690 |
| 6,618,198 B1 * | 9/2003 | Endo | 359/557 |

FOREIGN PATENT DOCUMENTS

| | | |
|---|---|---|
| JP | 58-95315 | 6/1983 |
| JP | 60-87312 | 5/1985 |
| JP | 2-201310 | 8/1990 |
| JP | 4-163415 | 6/1992 |
| JP | 4-235515 | 8/1992 |
| JP | 5-19170 | 1/1993 |
| JP | 5-241073 | 9/1993 |
| JP | 5-297276 | * 11/1993 |
| JP | 5-313065 | 11/1993 |
| JP | 6-82698 | 3/1994 |
| JP | 7-287168 | 10/1995 |

* cited by examiner

*Primary Examiner*—Georgia Epps
*Assistant Examiner*—William Choi
(74) *Attorney, Agent, or Firm*—Fitzpatrick, Cella, Harper & Scinto

(57) ABSTRACT

A zoom lens including, in order from an object side to an image side, a first lens unit L1 of negative refractive power, a second lens unit L2 of positive refractive power, a third lens unit L3 of negative refractive power, and a fourth lens unit L4 of positive refractive power, wherein, during variation of magnification from a wide-angle end to a telephoto end, L1 moves with a locus convex toward the image side, L2 moves toward the object side in such a way as to decrease a separation between L1 and L2, L3 moves toward the object side in such a way as to increase a separation between L2 and L3, and L4 moves toward the object side in such a way as to decrease a separation between L3 and L4, and wherein the Abbe number and refractive index of a negative lens included in L1 are appropriately set.

29 Claims, 16 Drawing Sheets

WIDE-ANGLE END

MIDDLE FOCAL LENGTH

TELEPHOTO END

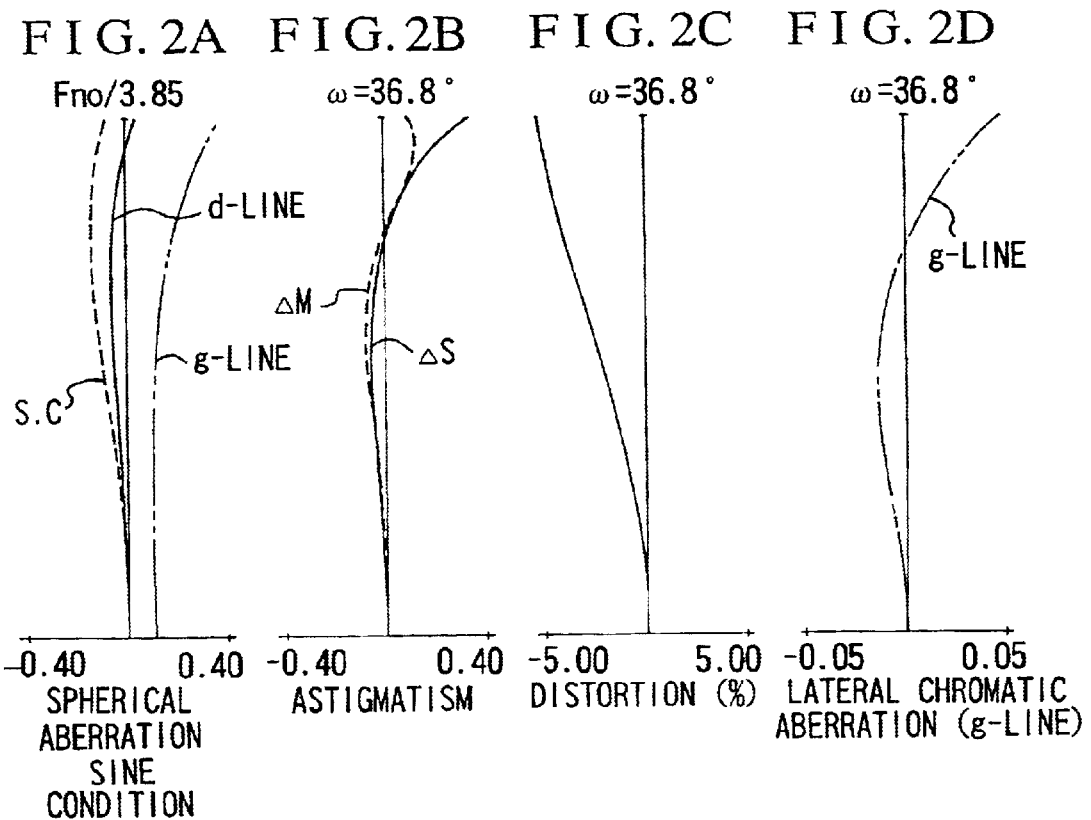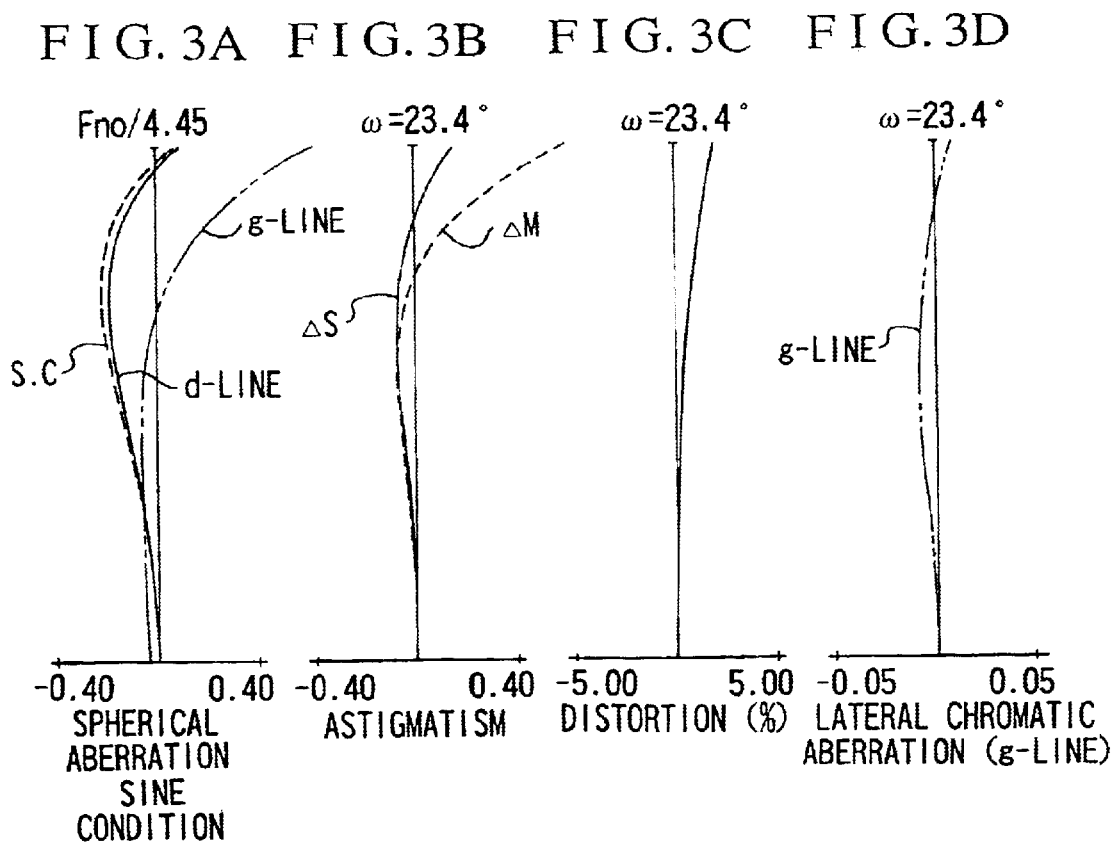

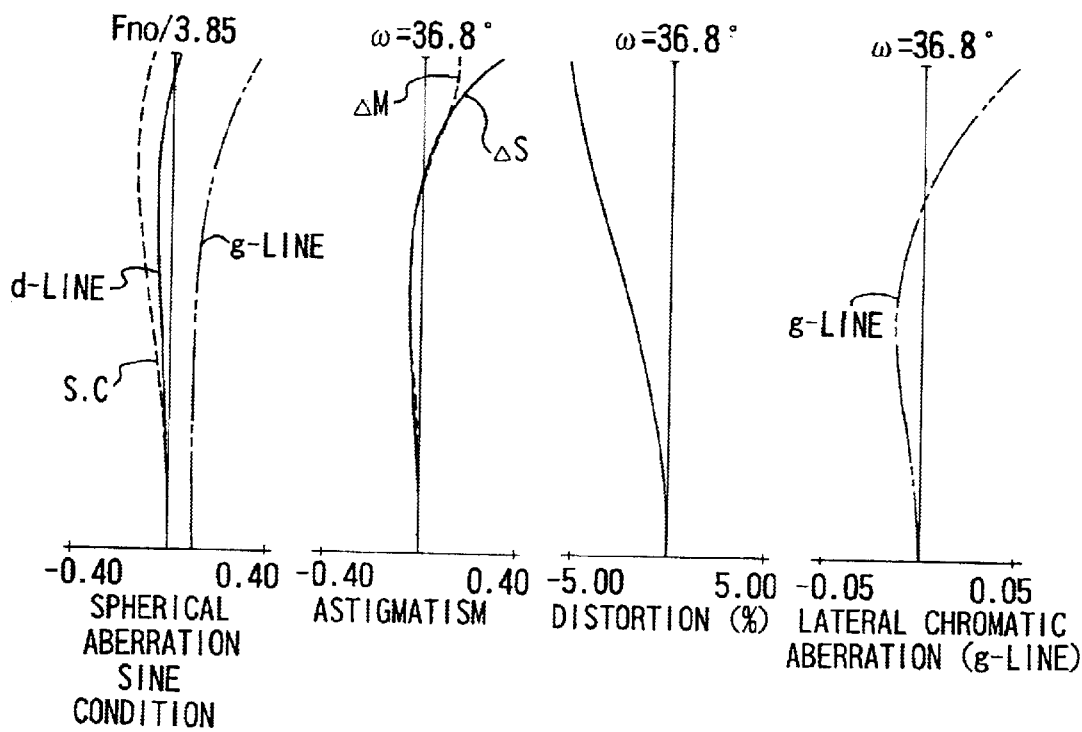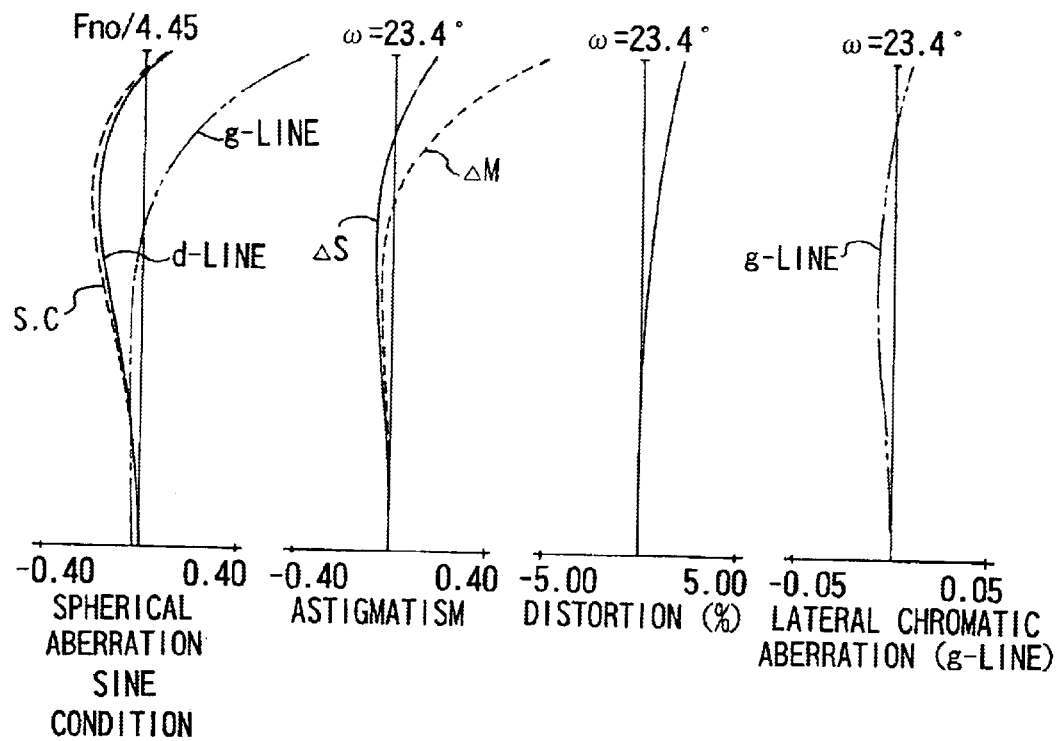

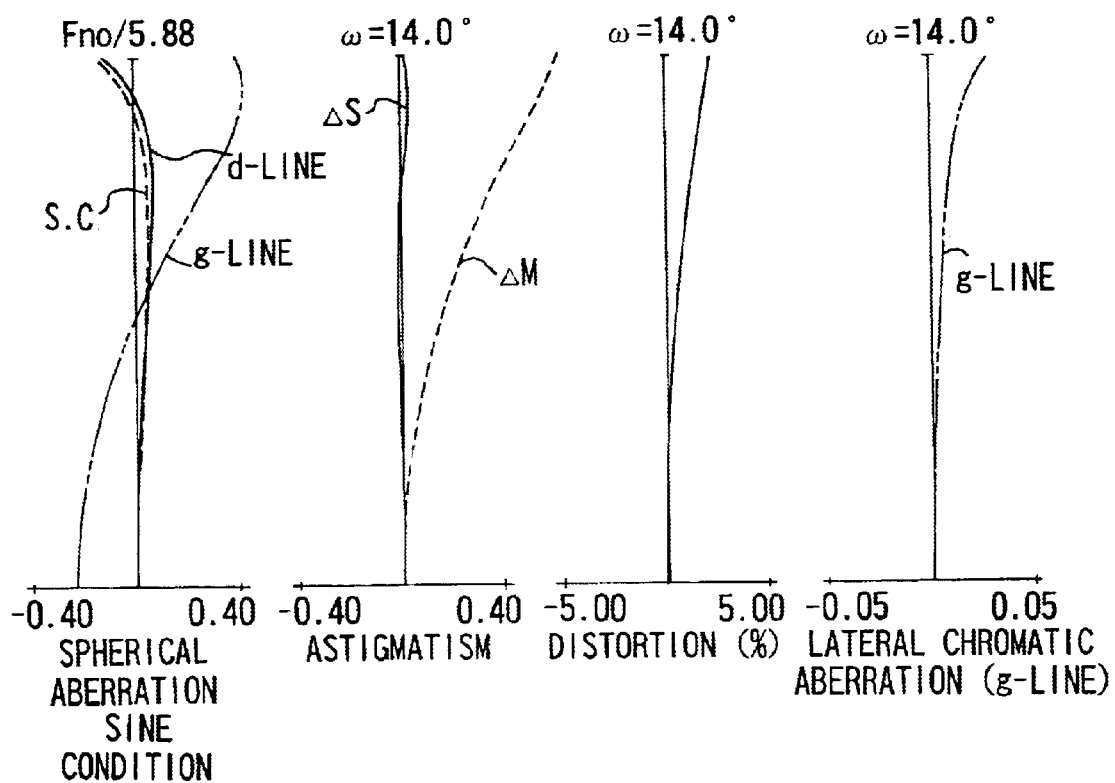
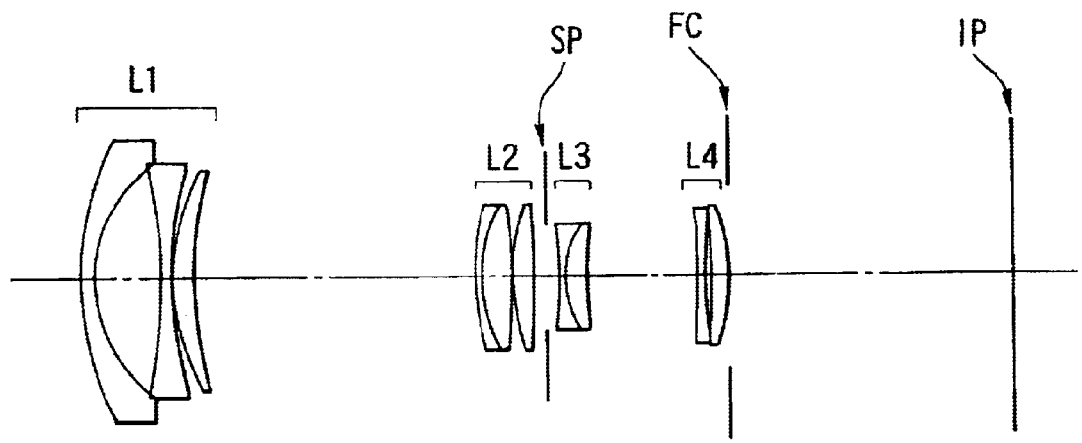

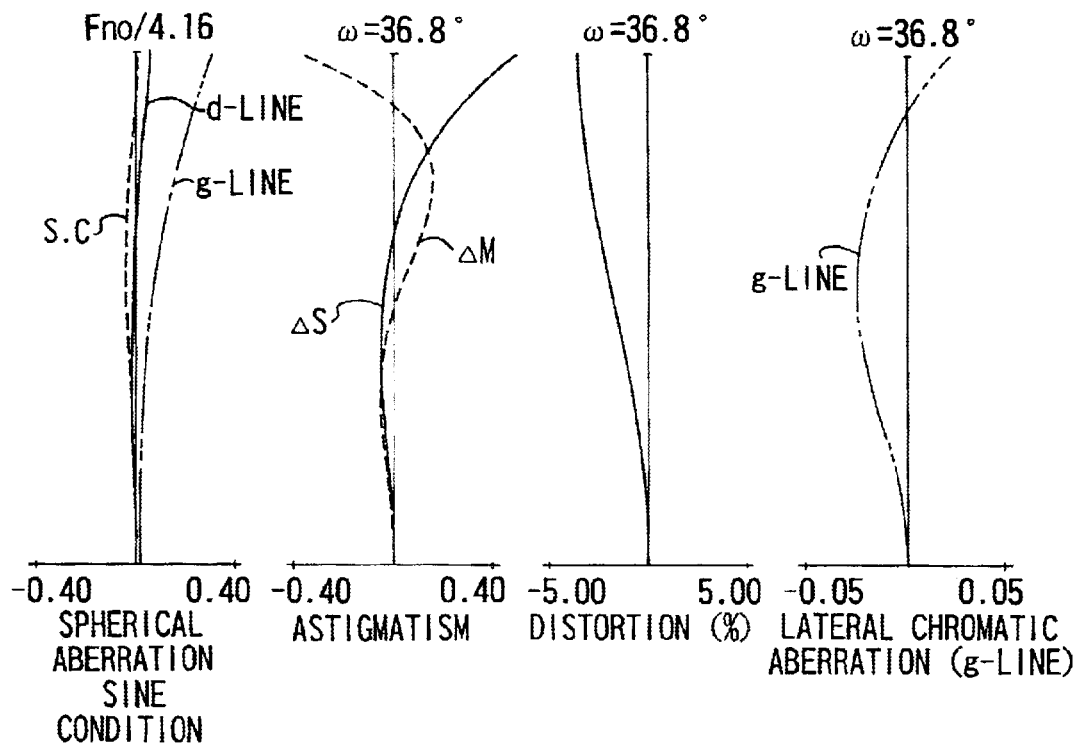
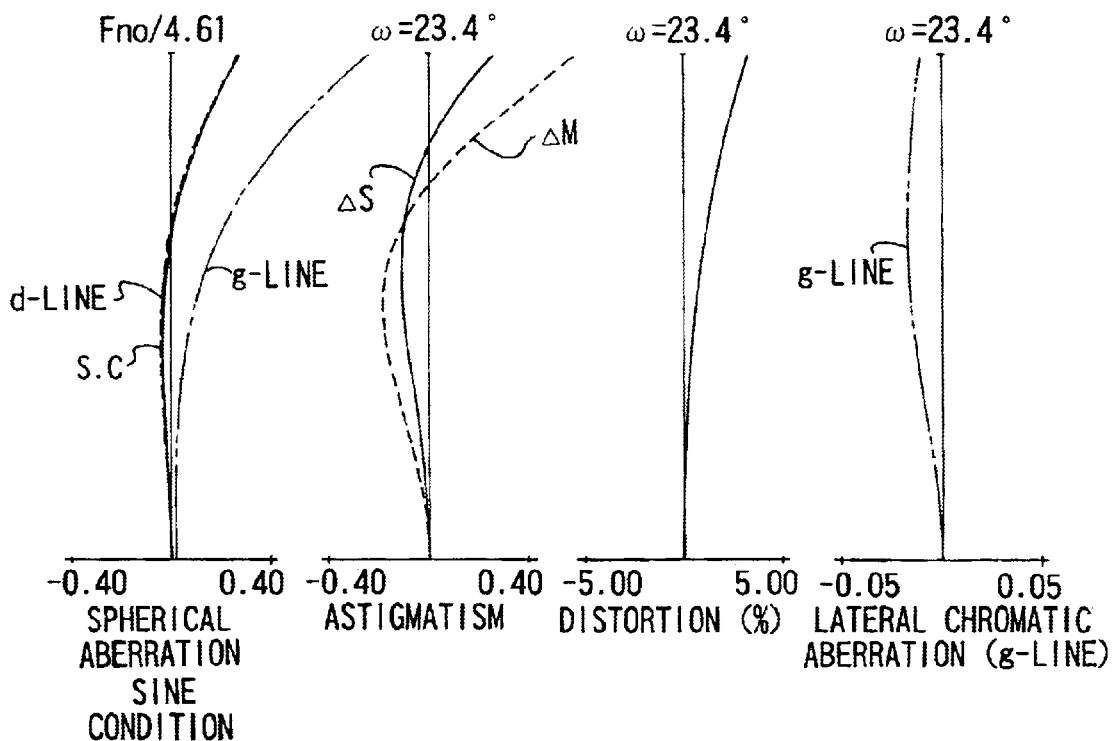

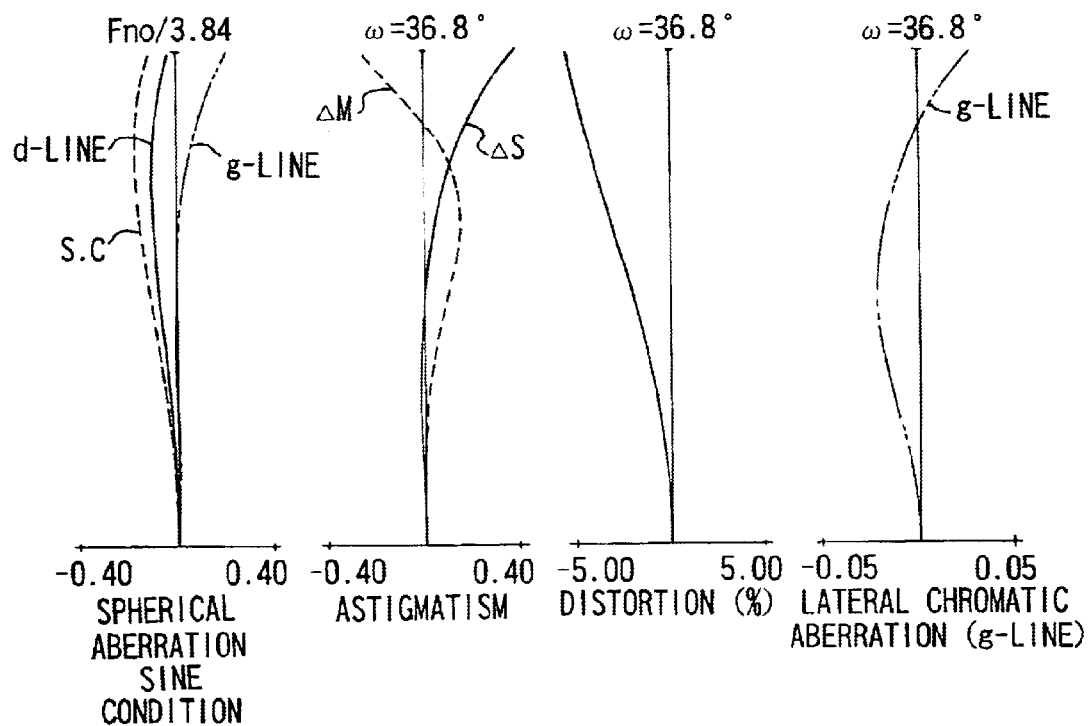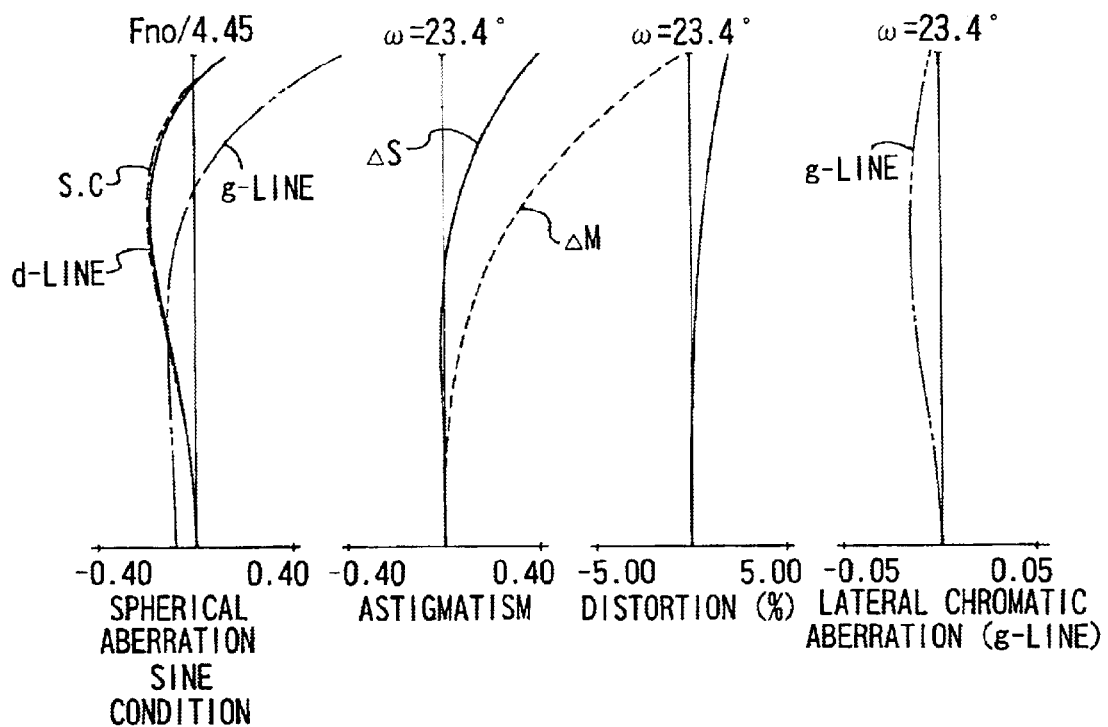

ZOOM LENS, AND IMAGE PICKUP APPARATUS AND IMAGE PROJECTION APPARATUS USING THE SAME

BACKGROUND OF THE INVENTION

1. Field of the Invention

The present invention relates to a zoom lens suited for a photographic camera for film, a video camera, a digital camera and a still video (SV) camera of the electronic recording type, etc., and more particularly to a zoom lens of the so-called negative lead type in which a negative lens unit leads.

2. Description of Related Art

Heretofore, there has been widely used, as a wide-angle zoom lens, a zoom lens of the so-called negative lead type in which a lens unit of negative refractive power leads, because, in the zoom lens of the negative lead type, the widening of an angle of view is relatively easy.

In the meanwhile, for example, in a zoom lens of the negative lead type having four lens units, at the telephoto end, the first lens unit and the second lens unit constitute a positive group as a whole and the third lens unit and the fourth lens unit constitute a negative group as a whole, so that the entire lens system can be formed into the so-called telephoto type. Therefore, the zoom lens of the negative lead type has such an advantage that it is easy to lengthen the focal length at the telephoto end. This is of course not limited to the four-unit zoom lens.

Among a great number of conventional zoom lenses of the negative lead type, four-unit zoom lenses of the negative lead type have been disclosed in, for example, Japanese Laid-Open Patent Applications No. Sho 60-87312, No. Hei 2-201310, No. Hei 5-241073, No. Hei 4-235515, No. Hei 4-163415, No. Hei 5-313065, No. Sho 58-95315, No. Hei 6-82698, No. Hei 5-19170, No. Hei 7-287168, etc. In these zoom lenses, the variation of magnification is effected by moving at least two lens units of the four lens units.

In the above-mentioned zoom lenses, in order to realize a wide angle of view while retaining a predetermined variable magnification ratio, a negative lens located on the most object side is made of a glass material having a high refractive index. Most of such a glass materials are expensive and are high in specific gravity, causing a considerably large problem in respect of the attainment of low cost and light weight of the zoom lens.

BRIEF SUMMARY OF THE INVENTION

It is an object of the invention to realize the low cost, light weight and small size of a zoom lens while retaining good optical performance thereof.

In the view of the above object, in accordance with an aspect of the invention, there is provided a zoom lens comprising, in order from an object side to an image side, a first lens unit of negative refractive power, a second lens unit of positive refractive power, a third lens unit of negative refractive power, and a fourth lens unit of positive refractive power, wherein the first lens unit has a negative lens located on the most object side thereof, and the negative lens located on the most object side of the first lens unit satisfies the following conditions:

(a) $35 < v11n < 65$, and (b) when $35 < v11n < 52$, $-0.013\ v11n + 2.19 < N11n < -0.005\ v11n + 1.92$, when $52 < v11n < 60$, $1.5 < N11n < -0.005\ v11n + 1.92$, when $60 < v11n < 65$, $1.5 < N11n < -0.022\ v11n + 2.94$, where $v11n$ is an Abbe number of a material of the negative lens located on the most object side of the first lens unit, and $N11n$ is a refractive index of the material of the negative lens located on the most object side of the first lens unit.

In the above zoom lens, the first lens unit has a second negative lens other than the negative lens located on the most object side thereof, and the second negative lens satisfies the following conditions:

(c) $35 < v12n < 65$, and (d) when $35 < v12n < 52$, $-0.013\ v12n + 2.19 < N12n < -0.005\ v12n + 1.92$, when $52 < v12n < 60$, $1.5 < N12n < -0.005\ v12n + 1.92$, when $60 < v12n < 65$, $1.5 < N12n < -0.022\ v12n + 2.94$, where $v12n$ is an Abbe number of a material of the second negative lens of the first lens unit, and $N12n$ is a refractive index of the material of the second negative lens of the first lens unit.

The above zoom lens becomes, at a telephoto end, a telephoto type in which a plurality of lens units are divided into a lens group on the object side composed of at least one lens unit having a positive refractive power and a lens group on the image side composed of at least one lens unit having a negative refractive power.

In the above zoom lens, during variation of magnification from a wide-angle end to a telephoto end, the first lens unit moves with a locus convex toward the image side, the second lens unit moves toward the object side in such a way as to decrease a separation between the first lens unit and the second lens unit, the third lens unit moves toward the object side in such a way as to increase a separation between the second lens unit and the third lens unit, and the fourth lens unit moves toward the object side in such a way as to decrease a separation between the third lens unit and the fourth lens unit.

The above zoom lens satisfies the following condition:

$0.9 < |f1/fw| < 1.8$ where f1 is a focal length of the first lens unit, and fw is a focal length of the entire zoom lens in a wide-angle end.

In the above zoom lens, the first lens unit comprises, in order from the object side to the image side, a negative lens of meniscus form having a convex surface facing the object side, a negative lens, and a positive lens of meniscus form having a convex surface facing the object side.

In the above zoom lens, the second lens unit and the fourth lens unit move in unison with each other during variation of magnification.

The above zoom lens satisfies the following conditions:

$0.65 < f2/fw < 1.3$ $1.2 < |f3/fw| < 3.4$ where f2 and f3 are focal lengths of the second lens unit and the third lens unit, respectively, and fw is a focal length of the entire zoom lens in a wide-angle end.

The above zoom lens consists of the first to fourth lens units, and satisfies the following condition:

$$2.1 < f4/fw < 8.5$$

where f4 is a focal length of the fourth lens unit, and fw is a focal length of the entire zoom lens in a wide-angle end.

In the above zoom lens, the second lens unit comprises two positive lenses and one negative lens.

In the above zoom lens, the third lens unit comprises a cemented lens composed of a negative lens and a positive lens.

In the above zoom lens, the fourth lens unit comprises a negative lens and a positive lens, and has at least one aspheric surface.

In the above zoom lens, the second lens unit comprises one positive lens and a positive cemented lens composed of a negative lens and a positive lens.

In the above zoom lens, the fourth lens unit has a plastic aspheric lens.

In the above zoom lens, the second lens unit comprises one positive lens and a positive cemented lens composed of a negative lens and a positive lens, the third lens unit comprises a negative lens and a positive lens, and the fourth lens unit comprises a negative lens and a positive lens, and has a plastic aspheric lens.

In accordance with another aspect of the invention, there is provided a zoom lens comprising, in order from an object side to an image side, a first lens unit of negative refractive power, a second lens unit of positive refractive power, and a third lens unit, wherein all said first to third lens units move during variation of magnification, the first lens unit has a negative lens located on the most object side thereof, and the negative lens located on the most object said of the first lens unit satisfies the following conditions:

(a) $35 < v11n < 65$, and (b) when $35 < v11n < 52$, $$-0.013 \, v11n + 2.19 < N11n < -0.005 \, v11n + 1.92,$$

when $52 < v11n < 60$, $$1.5 < N11n < -0.005 \, v11n + 1.92,$$

when $60 < v11n < 65$, $$1.5 < N11n < -0.022 \, v11n + 2.94,$$

where v11n is an Abbe number of a material of the negative lens located on the most object side of the first lens unit, and N11n is a refractive index of the material of the negative lens located on the most object side of the first lens unit.

In the above zoom lens, the third lens unit has a negative refractive power.

In accordance with a further aspect of the invention, there is provided a zoom lens comprising, in order from an object side to an image side, a first lens unit of negative refractive power and a second lens unit of positive refractive power, wherein the following conditions are satisfied:

$$1.1 < |f1/fw| < 1.4$$

$$0.8 < |f2/fw| < 1.1$$

where f1 and f2 are focal lengths of the first lens unit and the second lens unit, respectively, and fw is a focal length of the entire zoom lens in a wide-angle end.

In the above zoom lens, the second lens unit has a cemented lens composed of a negative lens and a positive lens, and the following condition is satisfied:

$$20 < v2p - v2n$$

where v2p is an Abbe number of a material of the positive lens of the cemented lens of the second lens unit, and v2n is an Abbe number of a material of the negative lens of the cemented lens of the second lens unit.

In accordance with a further aspect of the invention, there is provided a zoom lens comprising, in order from an object side to an image side, a first lens unit of negative refractive power, a second lens unit of positive refractive power, and a third lens unit of negative refractive power, wherein the following conditions are satisfied:

$$1.1 < |f1/fw| < 1.4$$

$$0.8 < |f2/fw| < 1.1$$

where f1 and f2 are focal lengths of the first lens unit and the second lens unit, respectively, and fw is a focal length of the entire zoom lens in a wide-angle end.

In the above zoom lens, a stop is disposed adjacent to the third lens unit, the stop moving in unison with the third lens unit.

In the above zoom lens, the stop is disposed on the object side of the third lens unit.

In the above zoom lens, the third lens unit comprises one positive lens and one negative lens, and the following condition is satisfied:

$$1.5 < |f3/fw| < 3.0$$

where f3 is a focal length of the third lens unit.

In the above zoom lens, the third lens unit has a cemented lens composed of a negative lens and a positive lens, and the following conditions are satisfied:

$$4.0 < v3n - v3p < 12.0$$

$$0.05 < N3p - N3n < 0.20$$

where v3n is an Abbe number of a material of the negative lens of the cemented lens of the third lens unit, v3p is an Abbe number of a material of the positive lens of the cemented lens of the third lens unit, N3p is a refractive index of the material of the positive lens of the cemented lens of the third lens unit, and N3n is a refractive index of the material of the negative lens of the cemented lens of the third lens unit.

In accordance with a further aspect of the invention, there is provided a zoom lens comprising, in order from an object side to an image side, a first lens unit of negative refractive power, a second lens unit of positive refractive power, a third lens unit of negative refractive power, and a fourth lens unit of positive refractive power, wherein the following conditions are satisfied:

$$1.1 < |f1/fw| < 1.4$$

$$0.8 < |f2/fw| < 1.1$$

where f1 and f2 are focal lengths of the first lens unit and the second lens unit, respectively, and fw is a focal length of the entire zoom lens in a wide-angle end.

The above zoom lens consists of the first to fourth lens units, the fourth lens unit comprises one positive lens and one negative lens, and the following condition is satisfied:

$$2.5 < |f4/fw| < 8.0$$

where f4 is a focal length of the fourth lens unit.

In the above zoom lens, the fourth lens unit has at least one aspheric surface.

In accordance with a further aspect of the invention, there is provided an image pickup apparatus comprising the above zoom lens, a photosensitive member, and means for supporting the zoom lens and the photosensitive member.

In accordance with a further aspect of the invention, there is provided an image projection apparatus comprising the above zoom lens, a light source, and an image forming element, and arranged to project an image.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 2A to 2D are aberration diagrams showing the various aberrations in the wide-angle end of the zoom lens according to the numerical example 1.

FIGS. 3A to 3D are aberration diagrams showing the various aberrations in the middle focal length position of the zoom lens according to the numerical example 1.

FIGS. 6A to 6D are aberration diagrams showing the various aberrations in the wide-angle end of the zoom lens according to the numerical example 2.

FIGS. 7A to 7D are aberration diagrams showing the various aberrations in the middle focal length position of the zoom lens according to the numerical example 2.

FIGS. 8A to 8D are aberration diagrams showing the various aberrations in the telephoto end of the zoom lens according to the numerical example 2.

FIG. 9 is a lens sectional view of a zoom lens according to a numerical example 3 of the invention.

FIGS. 10A to 10D are aberration diagrams showing the various aberrations in the wide-angle end of the zoom lens according to the numerical example 3.

FIGS. 11A to 11D are aberration diagrams showing the various aberrations in the middle focal length position of the zoom lens according to the numerical example 3.

FIGS. 22A to 22D are aberration diagrams showing the various aberrations in the wide-angle end of the zoom lens according to the numerical example 6.

FIGS. 23A to 23D are aberration diagrams showing the various aberrations in the middle focal length position of the zoom lens according to the numerical example 6.

DETAILED DESCRIPTION OF THE INVENTION

Hereinafter, preferred embodiments of the invention will be described in detail with reference to the drawings.

Figure 1A:
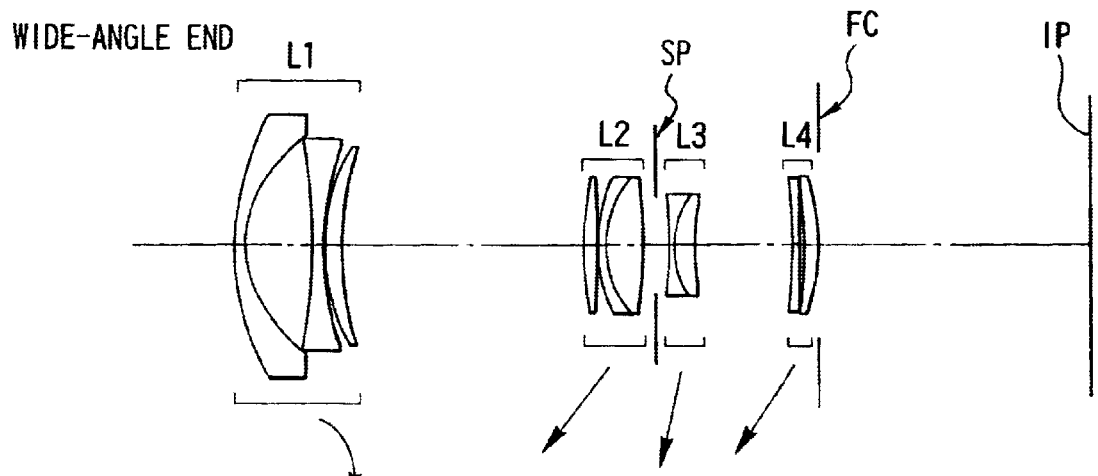
FIGS. 1A to 1C are lens sectional views in different focal length positions of a zoom lens according to a numerical example 1 of the invention.
Figure 1B:
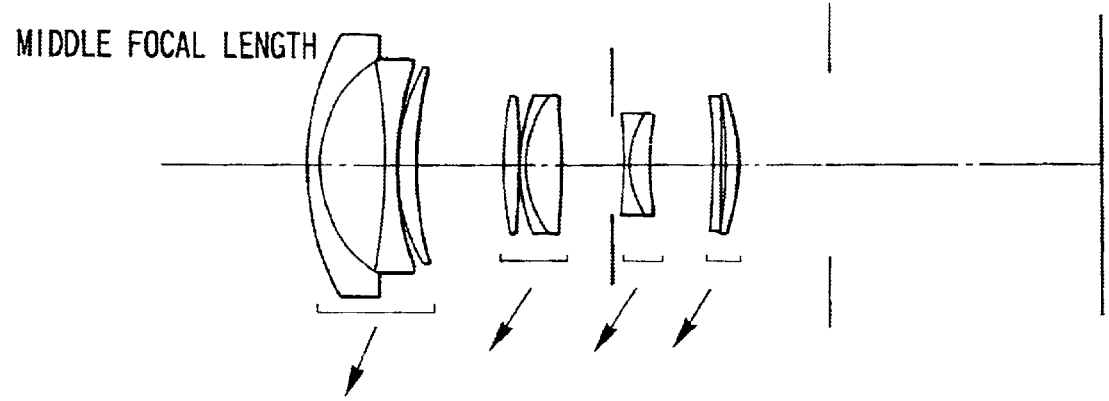
Figure 1C:
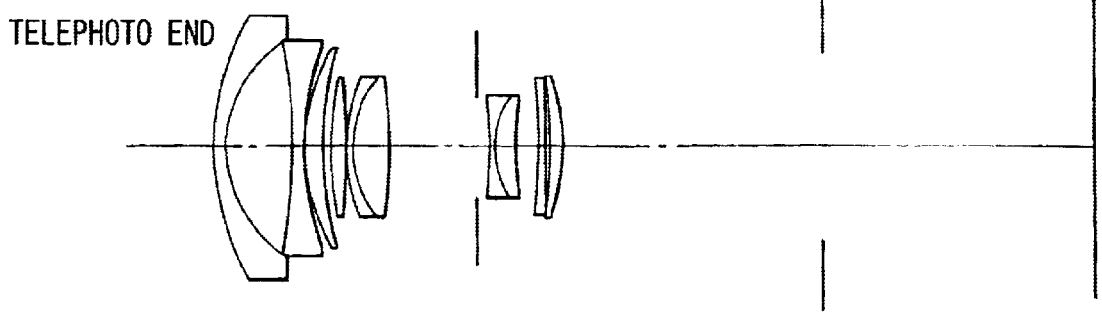
Figures 4A, 4B, 4C, 4D:
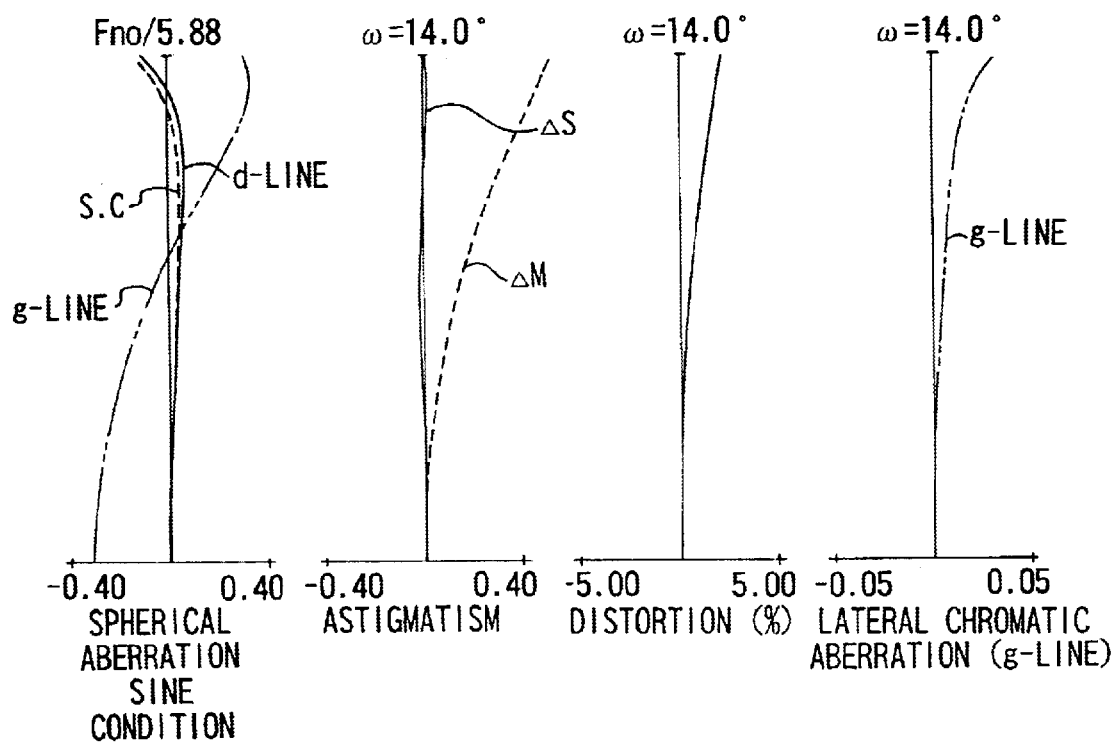
FIGS. 4A to 4D are aberration diagrams showing the various aberrations in the telephoto end of the zoom lens according to the numerical example 1.

FIGS. 1A to 1C are lens sectional views in the wide-angle end, the middle focal length position and the telephoto end, respectively, of a zoom lens according to a numerical example 1 of the invention. FIGS. 2A to 2D are aberration diagrams showing the various aberrations in the wide-angle end of the zoom lens according to the numerical example 1. FIGS. 3A to 3D are aberration diagrams showing the various aberrations in the middle focal length position of the zoom lens according to the numerical example 1. FIGS. 4A to 4D are aberration diagrams showing the various aberrations in the telephoto end of the zoom lens according to the numerical example 1.

Figure 5:
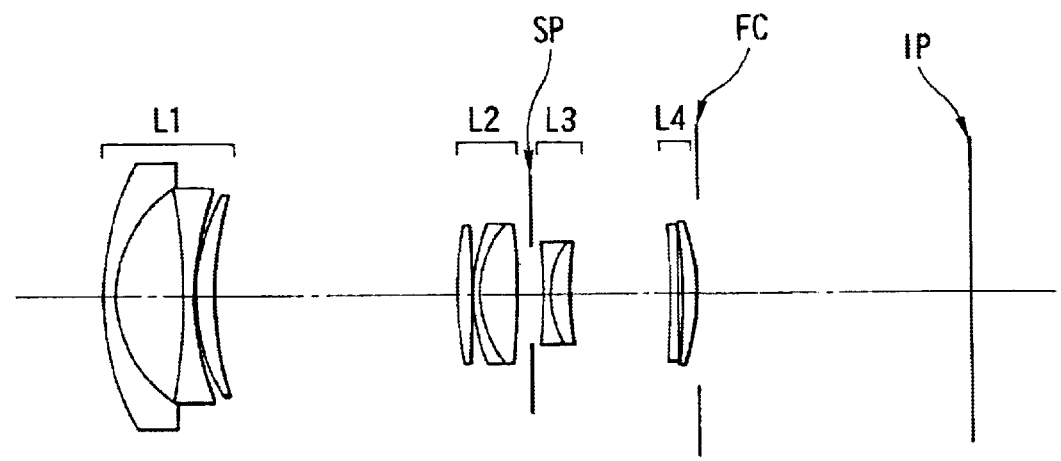
FIG. 5 is a lens sectional view of a zoom lens according to a numerical example 2 of the invention.
Figures 12A, 12B, 12C, 12D:
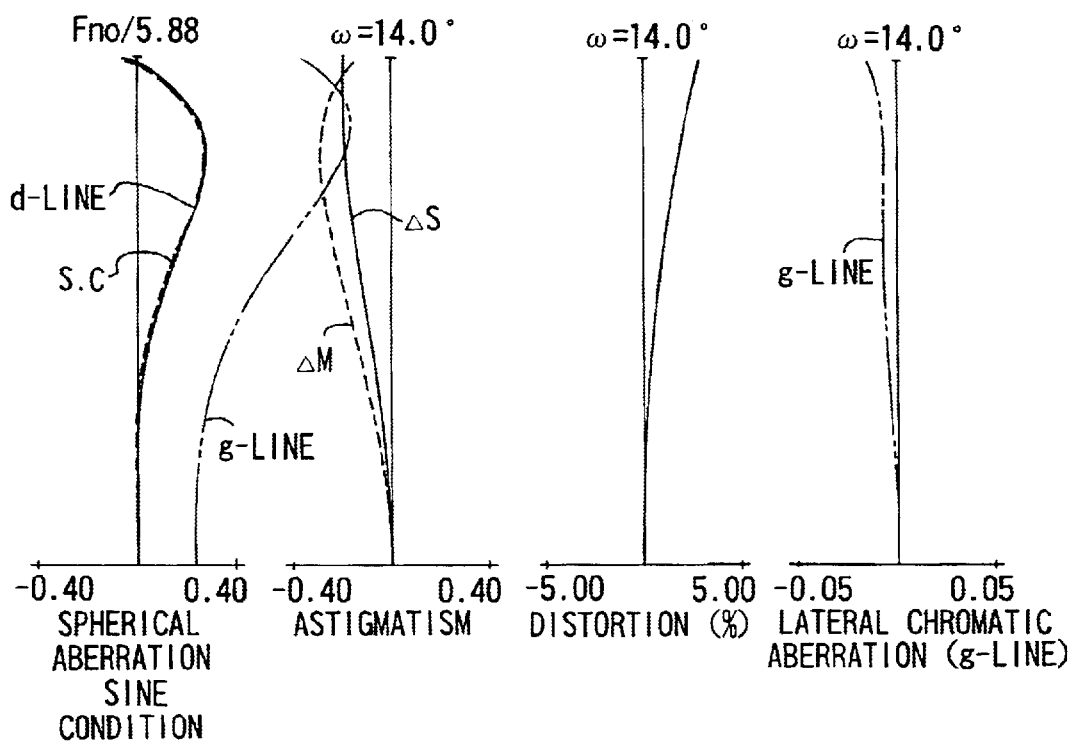
FIGS. 12A to 12D are aberration diagrams showing the various aberrations in the telephoto end of the zoom lens according to the numerical example 3.

FIG. 5 is a lens sectional view in the wide-angle end of a zoom lens according to a numerical example 2 of the invention. FIGS. 6A to 6D are aberration diagrams showing the various aberrations in the wide-angle end of the zoom lens according to the numerical example 2. FIGS. 7A to 7D are aberration diagrams showing the various aberrations in the middle focal length position of the zoom lens according to the numerical example 2. FIGS. 8A to 8D are aberration diagrams showing the various aberrations in the telephoto end of the zoom lens according to the numerical example 2.

FIG. 9 is a lens sectional view in the wide-angle end of a zoom lens according to a numerical example 3 of the invention. FIGS. 10A to 10D are aberration diagrams showing the various aberrations in the wide-angle end of the zoom lens according to the numerical example 3. FIGS. 11A to 11D are aberration diagrams showing the various aberrations in the middle focal length position of the zoom lens according to the numerical example 3. FIGS. 12A to 12D are aberration diagrams showing the various aberrations in the telephoto end of the zoom lens according to the numerical example 3.

Figure 13:
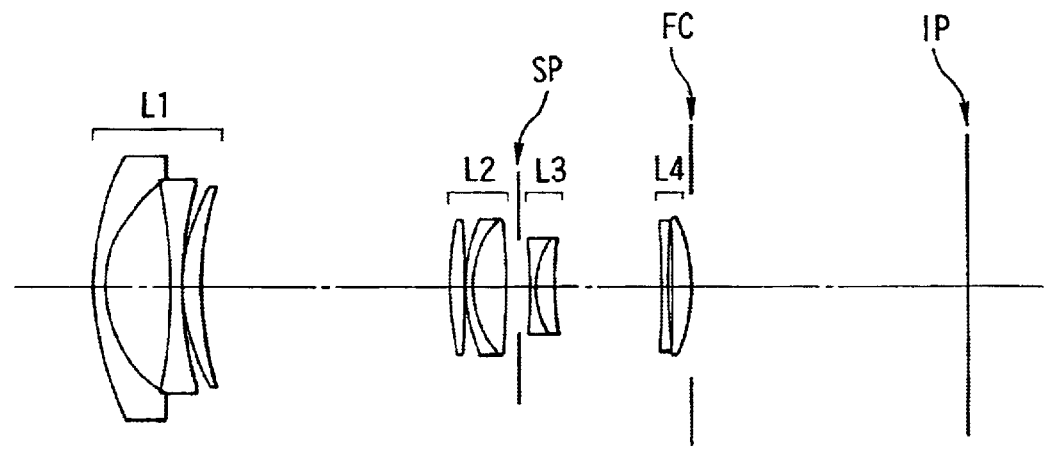
FIG. 13 is a lens sectional view of a zoom lens according to a numerical example 4 of the invention.
Figures 14A, 14B, 14C, 14D:
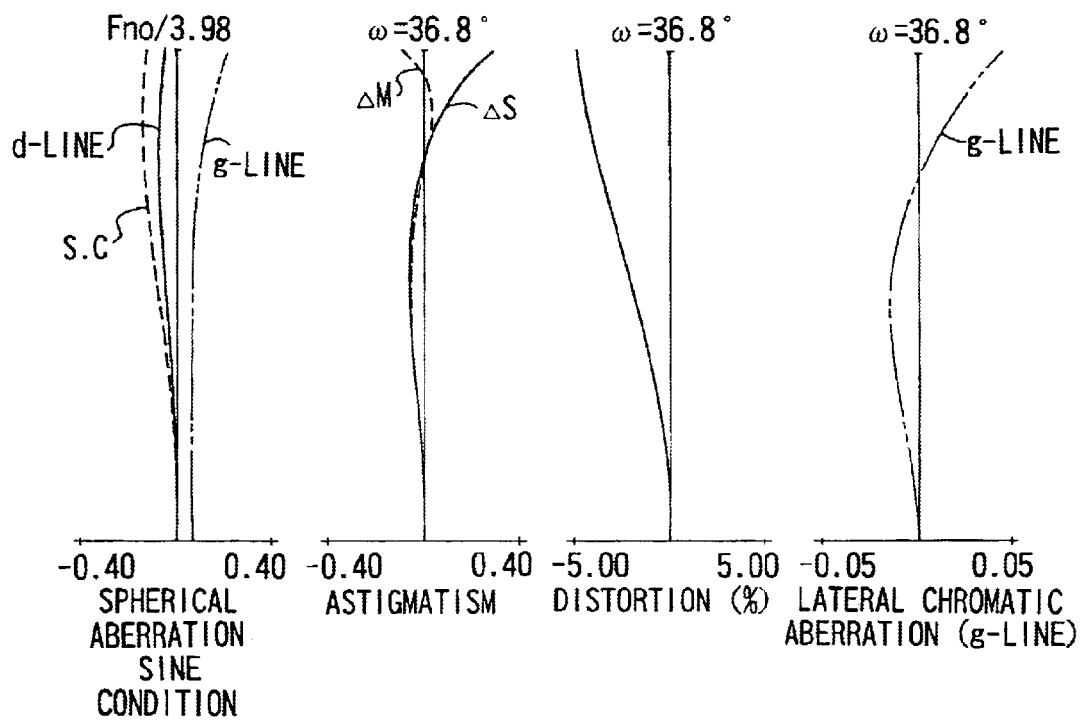
FIGS. 14A to 14D are aberration diagrams showing the various aberrations in the wide-angle end of the zoom lens according to the numerical example 4.
Figures 15A, 15B, 15C, 15D:
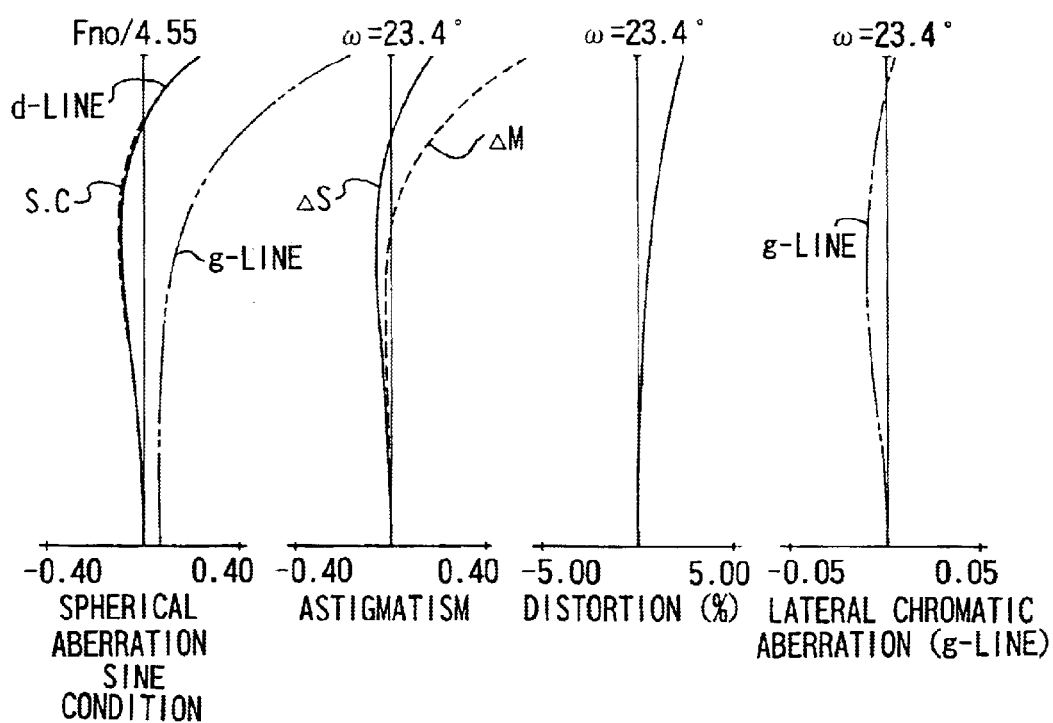
FIGS. 15A to 15D are aberration diagrams showing the various aberrations in the middle focal length position of the zoom lens according to the numerical example 4.
Figures 16A, 16B, 16C, 16D:
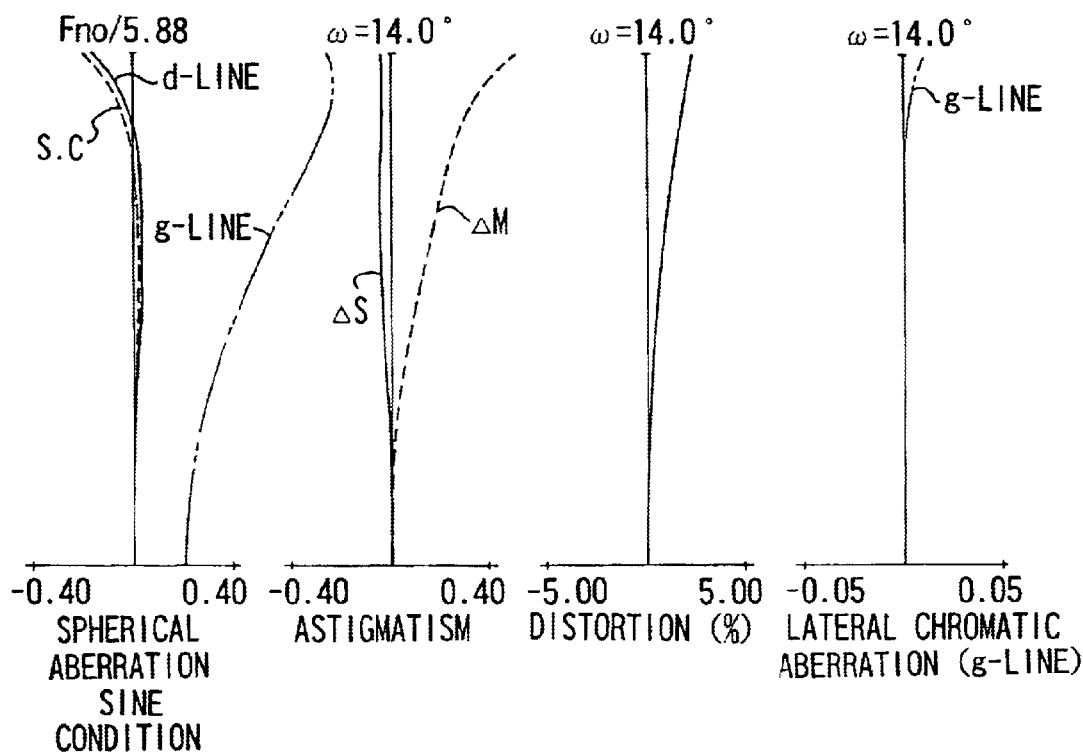
FIGS. 16A to 16D are aberration diagrams showing the various aberrations in the telephoto end of the zoom lens according to the numerical example 4.

FIG. 13 is a lens sectional view in the wide-angle end of a zoom lens according to a numerical example 4 of the invention. FIGS. 14A to 14D are aberration diagrams showing the various aberrations in the wide-angle end of the zoom lens according to the numerical example 4. FIGS. 15A to 15D are aberration diagrams showing the various aberrations in the middle focal length position of the zoom lens according to the numerical example 4. FIGS. 16A to 16D are aberration diagrams showing the various aberrations in the telephoto end of the zoom lens according to the numerical example 4.

Figure 17:
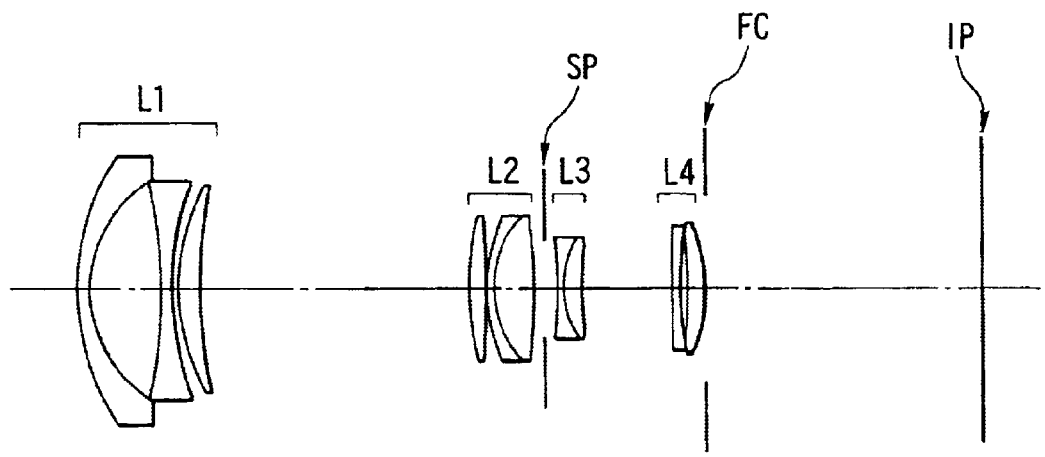
FIG. 17 is a lens sectional view of a zoom lens according to a numerical example 5 of the invention.
Figures 18A, 18B, 18C, 18D:
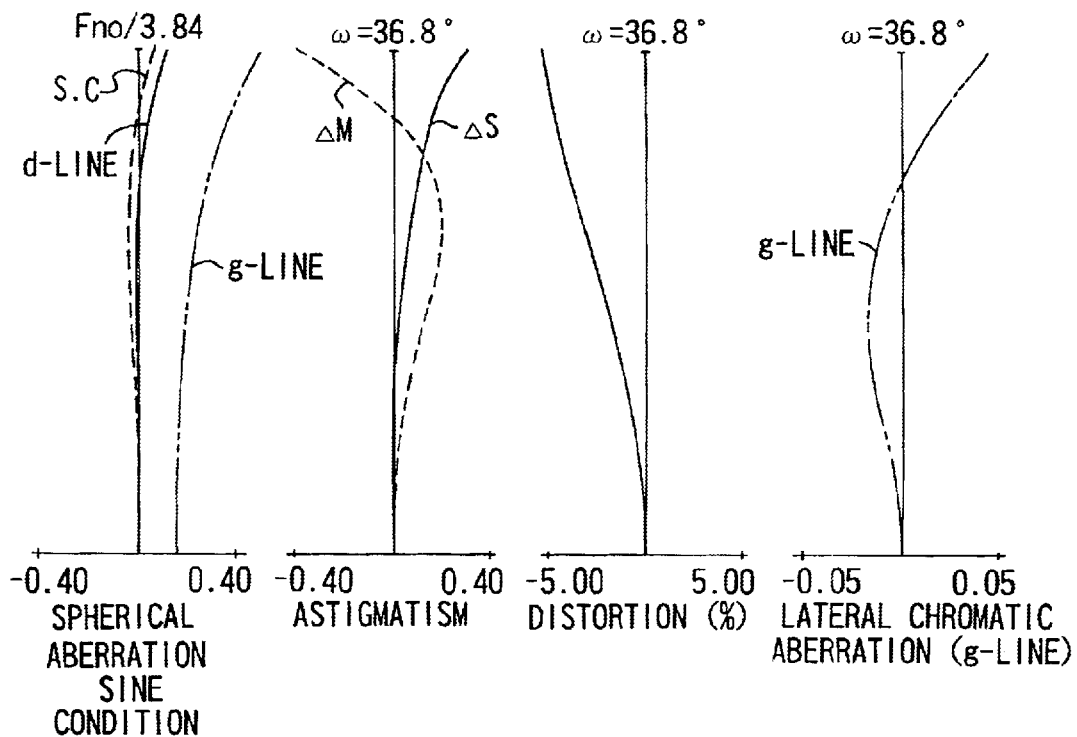
FIGS. 18A to 18D are aberration diagrams showing the various aberrations in the wide-angle end of the zoom lens according to the numerical example 5.
Figures 19A, 19B, 19C, 19D:
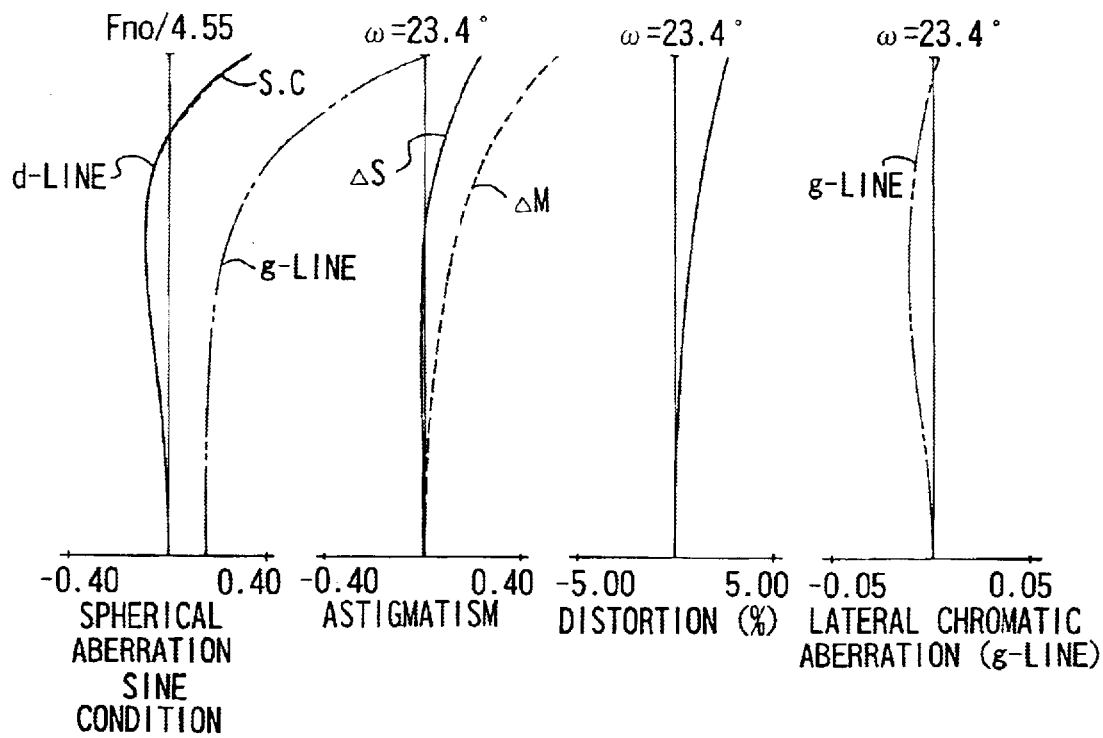
FIGS. 19A to 19D are aberration diagrams showing a the various aberrations in the middle focal length position of the zoom lens according to the numerical example 5.
Figures 20A, 20B, 20C, 20D:
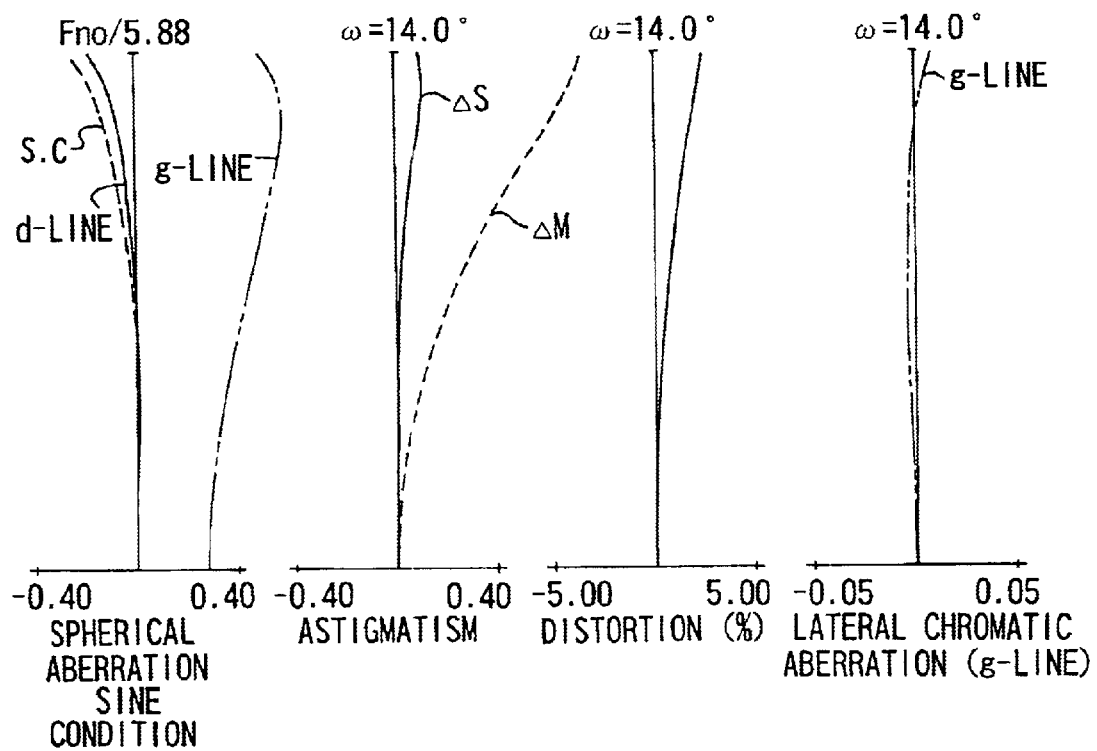
FIGS. 20A to 20D are aberration diagrams showing the various aberrations in the telephoto end of the zoom lens according to the numerical example 5.

FIG. 17 is a lens sectional view in the wide-angle end of a zoom lens according to a numerical example 5 of the invention. FIGS. 18A to 18D are aberration diagrams showing the various aberrations in the wide-angle end of the zoom lens according to the numerical example 5. FIGS. 19A to 19D are aberration diagrams showing the various aberrations in the middle focal length position of the zoom lens according to the numerical example 5. FIGS. 20A to 20D are aberration diagrams showing the various aberrations in the telephoto end of the zoom lens according to the numerical example 5.

Figure 21:
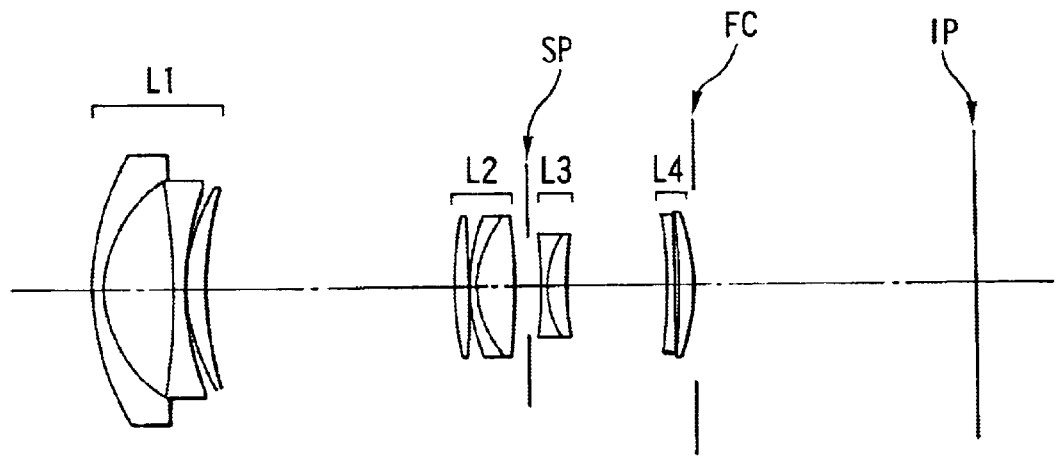
FIG. 21 is a lens sectional view of a zoom lens according to a numerical example 6 of the invention.
Figures 24A, 24B, 24C, 24D:
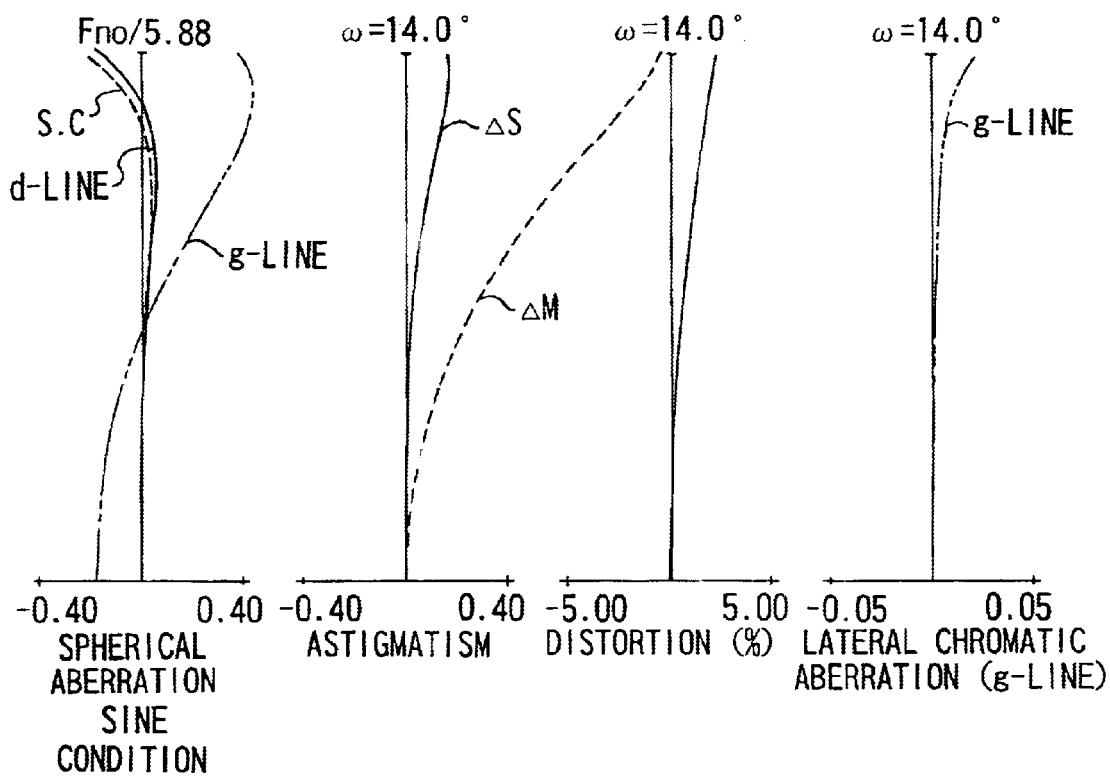
FIGS. 24A to 24D are aberration diagrams showing the various aberrations in the telephoto end of the zoom lens according to the numerical example 6.

FIG. 21 is a lens sectional view in the wide-angle end of a zoom lens according to a numerical example 6 of the invention. FIGS. 22A to 22D are aberration a diagrams showing the various aberrations in the wide-angle end of the zoom lens according to the numerical example 6. FIGS. 23A to 23D are aberration diagrams showing the various aberrations in the middle focal length position of the zoom lens according to the m numerical example 6. FIGS. 24A to 24D are aberration diagrams showing the various aberrations in the telephoto end of the zoom lens according to the numerical example 6.

Figure 25:
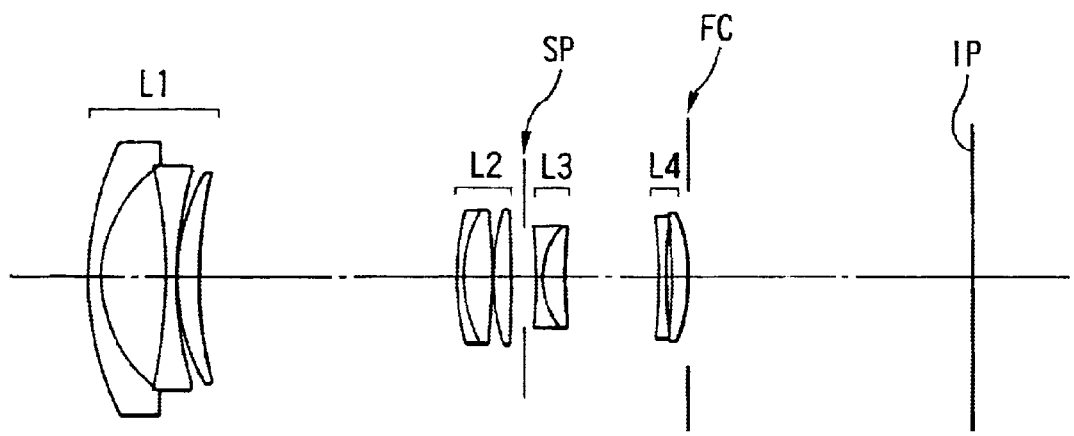
FIG. 25 is a lens sectional view of a zoom lens according to a numerical example 7 of the invention.
Figures 26A, 26B, 26C, 26D:
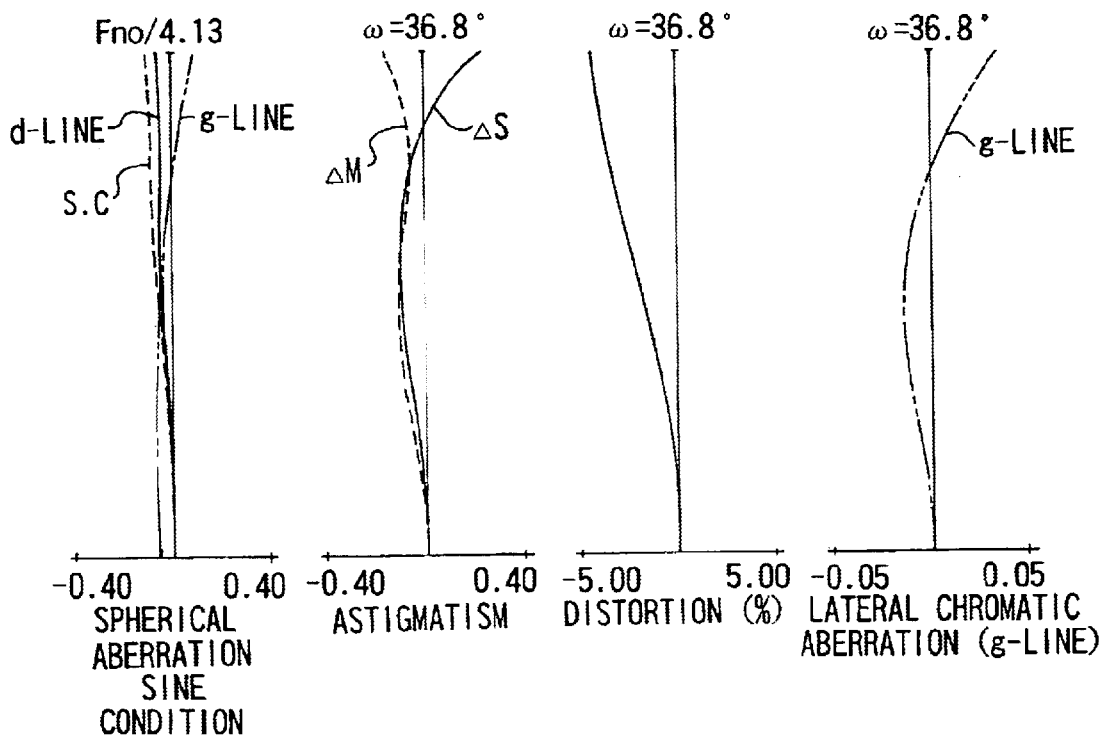
FIGS. 26A to 26D are aberration diagrams showing the various aberrations in the wide-angle end of the zoom lens according to the numerical example 7.
Figures 27A, 27B, 27C, 27D:
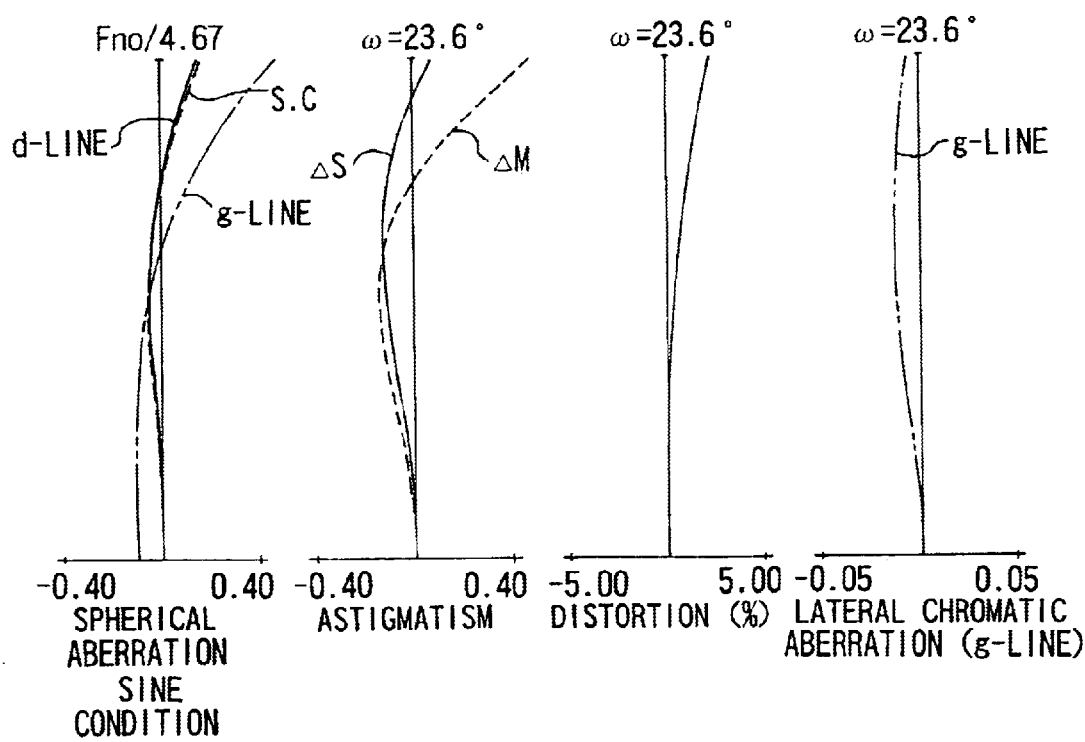
FIGS. 27A to 27D are aberration diagrams showing the various aberrations in the middle focal length position of the zoom lens according to the numerical example 7.
Figures 28A, 28B, 28C, 28D:
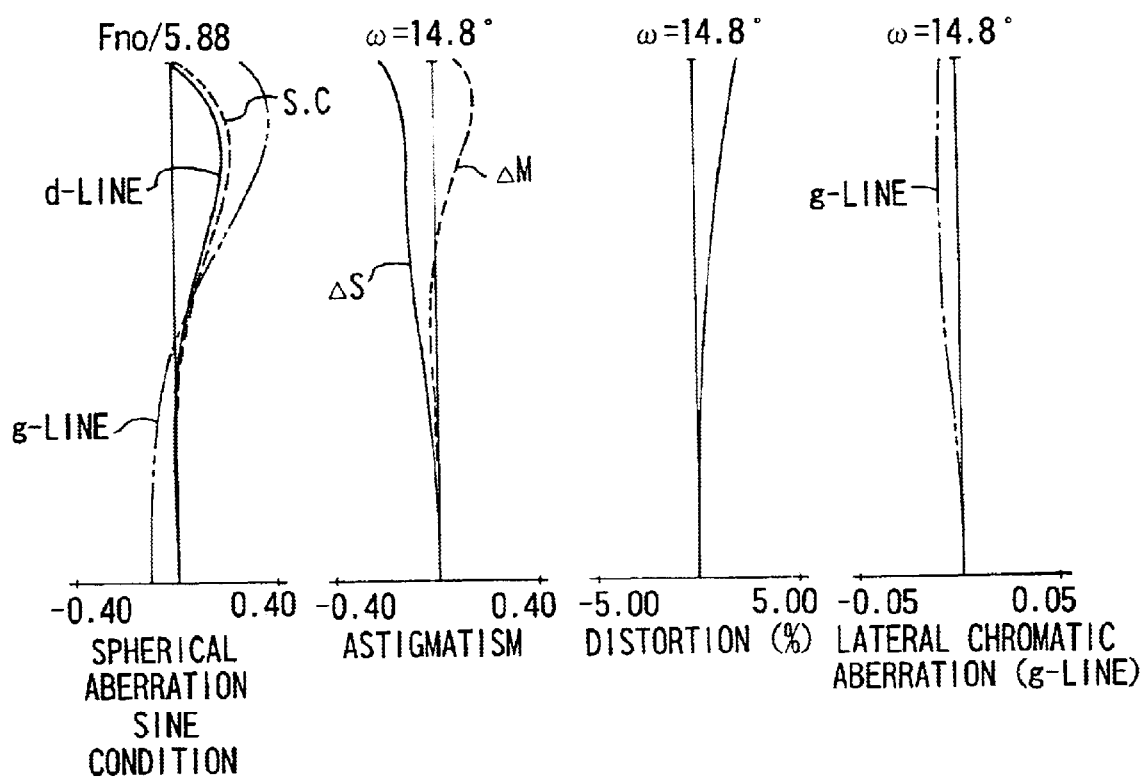
FIGS. 28A to 28D are aberration diagrams showing the various aberrations in the telephoto end of the zoom lens according to the numerical example 7.

FIG. 25 is a lens sectional view in the wide-angle end of a zoom lens according to a numerical example 7 of the invention. FIGS. 26A to 26D are aberration diagrams showing the various aberrations in the wide-angle end of the zoom lens according to the numerical example 7. FIGS. 27A to 27D are aberration diagrams showing the various aberrations in the middle focal length position of the zoom lens according to the numerical example 7. FIGS. 28A to 28D are aberration diagrams showing the various aberrations in the telephoto end of the zoom lens according to the numerical example 7.

In each of the lens sectional views of FIGS. 1A, 5, 9, 13, 17, 21 and 25, reference character L1 denotes a first lens unit of negative refractive power, reference character L2 denotes a second lens unit of positive refractive power, reference character L3 denotes a third lens unit of negative refractive power, reference character L4 denotes a fourth lens unit of positive refractive power, reference character SP denotes an aperture stop, reference character FC denotes a flare-cutting stop, and reference character IP denotes an image plane.

Arrows shown in the lens sectional views indicate the respective movement loci of the first lens unit L1 to the fourth lens unit L4 during the variation of magnification from the wide-angle end to the telephoto end. It is to be noted that the wide-angle end and the telephoto end mean zoom positions obtained when the lens unit for the variation of magnification is located at both ends of a mechanically movable range thereof on the optical axis.

In the embodiments of the invention, during the variation of magnification from the wide-angle end to the telephoto end, the first lens unit L1 is moved in an approximately-reciprocating manner with a locus convex toward the image side to compensate for the shift of an image plane caused by the variation of magnification, and the second lens unit L2, the third lens unit L3 and the fourth lens unit L4 are moved toward the object side to effect the variation of magnification.

In this instance, the second lens unit L2 is moved in such a way as to decrease a separation between the first lens unit L1 and the second lens unit L2, the third lens unit L3 is moved in such a way as to increase a separation between the second lens unit L2 and the third lens unit L3, and the fourth lens unit L4 is moved in such a way as to decrease a separation between the third lens unit L3 and the fourth lens unit L4. Further, focusing is effected by moving the first lens unit L1.

As described above, the entire lens system is composed of four lens units, and the separation between the respective adjacent lens units is varied during the variation of magnification, so that a compact zoom lens having a wide angle of view and a high variable magnification ratio can be attained.

The zoom lens according to the invention has a basic construction as mentioned in the foregoing. In addition, the stop SP, which is disposed in the vicinity of the third lens unit L3, moves in unison with the third lens unit L3 during the variation of magnification. Further, the flare-cutting stop FC is disposed between the fourth lens unit L4 and the image plane IP to cut off unnecessary light rays appearing on the wide-angle side and in the middle angle of view, thereby improving the image quality.

Next, characteristic features of the first embodiment and the second embodiment of the invention will be described.

(A) The zoom lens according to the first embodiment, while having the above-mentioned basic construction, satisfies the following conditions (1), (2a), (2b) and (2c), or satisfies the following conditions (1) to (3):

(a) $37 < v1n < 65$,        (1)

(b) when $35 < v1n < 52$, $-0.013\ v1n + 2.19 < N1n < -0.005\ v1n + 1.92$,        (2a)

when $52 < v1n < 60$, $1.5 < N1n < -0.005\ v1n + 1.92$,        (2b)

when $60 < v1n < 65$, $1.5 < N1n < -0.022\ v1n + 2.94$,        (2c)

(c) $0.9 < |f1/fw| < 1.8$        (3)

where $v1n$ is an Abbe number of a material of a negative lens included in the first lens unit, $N1n$ is a refractive index of the material of the negative lens included in the first lens unit, $f1$ is a focal length of the first lens unit L1, and $fw$ is a focal length of the entire zoom lens in the wide-angle end.

In general, in a photographic lens for single-lens reflex cameras, the lens diameter of the first lens unit is large as compared with those of the other lens units. In particular, in a zoom lens of the so-called negative lead type in which a negative lens unit leads, as in the zoom lens according to the invention, the edge thickness of a negative lens included in the first lens unit becomes large. Therefore, the volume of the negative lens occupies a large percentage of the sum in volume of all the lenses included in the entire zoom lens. Accordingly, the negative lens occupies a large percentage of the entire zoom lens also in weight.

In view of the above, the first embodiment of the invention provides conditions for appropriately setting a refractive index and Abbe number of a glass material of the negative lens included in the first lens unit and for appropriately setting the focal length of the first lens unit obtained when such a glass material is employed.

The condition (1) is one of conditions for appropriately setting an Abbe number of the material of the negative lens included in the first lens unit. If the upper limit of the condition (1) is exceeded, the material of the negative lens becomes a glass material of high specific gravity, such as phosphate crown glass or fluor crown glass. If the lower limit of the condition (1) is exceeded, it becomes difficult to correct negative lateral chromatic aberration at the wide-angle end.

The conditions (2a), (2b) and (2c) are provided for appropriately setting a refractive index and Abbe number of the material of the negative lens included in the first lens unit. If the upper limit of each of the conditions (2a), (2b) and (2c) is exceeded, the material of the negative lens becomes a glass material of high specific gravity, such as lanthanum or dense phosphate crown glass. If the lower limit of each of the conditions (2a), (2b) and (2c) is exceeded, it becomes difficult to correct well negative lateral chromatic aberration and negative distortion simultaneously at the wide-angle end.

It should be noted that the above-mentioned negative lens included in the first lens unit may be a negative lens disposed on the most object side of the first lens unit, or may be a negative lens included in the first lens unit other than the negative lens disposed on the most object side of the first lens unit.

The condition (3) is provided for appropriately setting the focal length of the first lens unit in a case where the glass material defined according to the conditions (1), (2a), (2b) and (2c) is used for the negative lens included in the first lens unit. If the upper limit of the condition (3) is exceeded, it becomes difficult to secure a predetermined variable magnification ratio or to reduce the size of the diameter of a front lens member. If the lower limit of the condition (3) is exceeded, it becomes difficult to correct distortion, coma and curvature of field at the wide-angle end, or it becomes difficult to secure a bright F-number at the telephoto end, because it becomes hard for the zoom lens to take a refractive power arrangement of the telephoto type at the telephoto end.

In the first embodiment, desirably, it is preferred that the conditions (1) to (3) are limited to the following ranges:

(a)' $37 < v1n < 65$, (1)'

(b)' when $35 < v1n < 52$, $-0.008\, v1n + 2.02 < N1n < -0.005\, v1n + 1.90$, (2a)' when $52 < v1n < 60$, $-0.008\, v1n + 2.02 < N1n < -0.005\, v1n + 1.92$, (2b)' when $60 < v1n < 65$, $-0.008\, v1n + 2.02 < N1n < -0.022\, v1n + 2.94$, (2c)'

(c)' $1.15 < |f1/fw| < 1.45$ (3)'

While the zoom lens according to the first embodiment is realized by satisfying the above-described conditions, in order to further attain the shortening of the total length of the zoom lens while maintaining good optical performance, it is desirable to satisfy at least one of the following conditions.

(a-1) The first lens unit comprises, in order from the object side to the image side, a negative lens of meniscus form having a convex surface facing the object side, a negative lens, and a positive lens of meniscus form having a convex surface facing the object side.

As mentioned in the foregoing, the increase of the lens diameter of a front lens member greatly affects an increase in cost. In order to suppress this increase, it is necessary to make small the angle which an off-axial ray of light having passed through the first lens unit makes with the optical axis, by causing a negative refractive power to concentrate on the most object side. In other words, if an off-axial ray of light advances along an optical path which makes a small angle with the optical axis when viewing the first lens unit from the stop, it can be said that the size of the first lens unit does not become large.

In view of the above principle, in the first embodiment, two negative lenses are disposed on the most object side of the negative first lens unit, thereby reducing the diameter of a front lens member.

Further, in order to decrease the various aberrations occurring in the first lens unit, the negative lens disposed on the most object side is made to be a negative lens of meniscus form having a convex surface facing the object side, thereby making it easy to correct distortion and coma at the wide-angle end, in particular. In addition, on the image side of the above two negative lenses, there is disposed a positive lens, thereby correcting spherical aberration at the telephoto end, in particular.

If, desirably, the first lens unit is made to comprise, in order from the object side to the image side, a negative lens of meniscus form having a convex surface facing the object side, a negative lens both lens surfaces of which are concave, and a positive lens of meniscus form having a convex surface facing the object side, it becomes possible to easily attain the above advantageous effect.

(a-2) The second lens unit and the fourth lens unit move in unison with each other during the variation of magnification.

With the second lens unit and the fourth lens unit made to move in unison with each other during the variation of magnification, the structure of a lens barrel can be advantageously simplified.

(a-3) The following conditions are satisfied:

$0.65 < f2/fw < 1.3$ (4)

$1.2 < |f3/fw| < 3.4$ (5)

$2.1 < f4/fw < 8.5$ (6)

where f2, f3 and f4 are focal lengths of the second lens unit, the third lens unit and the fourth lens unit, respectively.

The condition (4) is provided for appropriately setting the focal length of the second lens unit. If the upper limit of the condition (4) is exceeded, it becomes difficult to secure a required variable magnification ratio, or it becomes difficult to secure a bright F-number at the telephoto end, because it becomes hard for the zoom lens to take a refractive power arrangement of the telephoto type at the telephoto end. If the lower limit of the condition (4) is exceeded, it becomes difficult to correct spherical aberration at the telephoto end, in particular.

The condition (5) is provided for appropriately setting the focal length of the third lens unit. If the upper limit of the condition (5) is exceeded, it becomes difficult to set a composite refractive power of the third lens unit and the fourth lens unit at the telephoto end to a sufficient negative refractive power, or it becomes difficult to secure a bright F-number at the telephoto end, because it becomes hard for the zoom lens to take a refractive power arrangement of the telephoto type at the telephoto end. If the lower limit of the condition (5) is exceeded, it becomes difficult to correct, in particular, coma and distortion throughout a the whole focal length range.

The condition (6) is provided for appropriately setting the focal length of the fourth lens unit. If the upper limit of the condition (6) is exceeded, it becomes difficult to correct spherical aberration, in particular, at the telephoto end. If the lower limit of the condition (6) is exceeded, it becomes difficult to correct negative distortion at the wide-angle end.

Desirably, it is preferred that the conditions (4) to (6) are limited to the following ranges:

$$0.84 < f2/fw < 1.1 \quad (4)'$$

$$1.6 < |f3/fw| < 2.8 \quad (5)'$$

$$2.8 < f4/fw < 7.1 \quad (6)'$$

(a-4) The second lens unit comprises two positive lenses and one negative lens.

In the type of zoom lens according to the first embodiment, the second lens unit of positive refractive power is not only a main lens unit for the variation of magnification but also a lens unit which most greatly bears a positive refractive power of the entire zoom lens from the wide-angle end through the telephoto end, and, therefore, requires a relatively strong refractive power. For that purpose, it is necessary to dispose a plurality of positive lenses in the second lens unit. However, if the number of positive lenses is excessively increased, the on-axial thickness of the second lens unit increases, so that the distance between the stop and the first lens unit becomes large. As a result, not only the second lens unit but also the first lens unit tends to become large in size.

In view of this, in the first embodiment, the positive second lens unit is made to have such a simple construction that only two positive lens and one negative lens are disposed therein. In that construction, the one negative lens bears the role of correcting the various aberrations occurring in the two positive lenses, in particular, spherical aberration at the telephoto end.

(a-5) The third lens unit comprises a cemented lens composed of a negative lens and a positive lens.

With the third lens unit composed of a positive lens and a negative lens which are the minimum unit necessary for correcting chromatic aberration, it becomes possible to easily attain good optical performance and compactness of the zoom lens. Further, with the positive lens and the negative lens cemented together, it is possible to heighten such an advantageous effect.

(a-6) The fourth lens unit comprises a negative lens and a positive lens, and has at least one aspheric surface.

With the fourth lens unit composed of a positive lens and a negative lens which are the minimum unit necessary for correcting chromatic aberration, it becomes possible to easily attain good optical performance and compactness of the zoom lens. Further, with an aspheric surface used in the fourth lens unit, it becomes easy to correct curvature of field and distortion at the wide-angle end and spherical aberration at the telephoto end.

Desirably, it is preferred that the aspheric surface of the fourth lens unit is formed such that a negative refractive power thereof becomes progressively stronger according to a distance away from the optical axis.

(a-7) The second lens unit comprises one positive lens and a positive cemented lens composed of a negative lens and a positive lens.

With the cemented lens composed of a negative lens and a positive lens disposed in the second lens unit, it is possible to correct well longitudinal chromatic aberration at the telephoto end, in particular.

(a-8) The fourth lens unit has a plastic aspheric lens.

With the aspheric surface applied to a plastic lens, it becomes easy to manufacture the aspheric lens.

(B) The zoom lens according to the second embodiment, while having the above-mentioned construction, is formed such that the first lens unit comprises, in order from the object side to the image side, a negative lens of meniscus form having a convex surface facing the object side, a negative lens and a positive lens, the second lens unit comprises two positive lenses and one negative lens, and the stop is disposed in the vicinity of the third lens unit and is moved in unison with the third lens unit, and satisfies the following conditions (7) and (8):

$$1.1 < |f1/fw| < 1.4 \quad (7)$$

$$0.8 < f2/fw < 1.1 \quad (8)$$

where f1 and f2 are focal lengths of the first lens unit and the second lens unit, respectively, and fw is a focal length of the entire zoom lens in the wide-angle end.

In general, in the case of a zoom lens including a wide angle region, the diameter of a front lens member thereof is apt to become large. This causes an increase in weight of the zoom lens. In order to suppress this increase, it is necessary to make small the angle which an off-axial ray of light having passed through the first lens unit makes with the optical axis, by causing a negative refractive power to concentrate on the most object side.

In other words, if an off-axial ray of light advances along an optical path which makes a small angle with the optical axis when viewing the first lens unit from the stop, it can be said that the size of the first lens unit does not become large.

In view of the above principle, in the second embodiment, two negative lenses are disposed on the most object side of the first lens unit of negative refractive power, thereby reducing the diameter of a front lens member.

Further, in order to decrease the various aberrations occurring in the first lens unit, the negative lens disposed on the most object side is made to be a negative lens of meniscus form having a convex surface facing the object side, thereby making it easy to correct distortion and coma at the wide-angle end, in particular. In addition, on the image side of the above two negative lenses, there is disposed a positive lens, thereby correcting spherical aberration at the telephoto end, in particular.

The condition (7) is provided for appropriately setting the focal length of the first lens unit. In general, in the case of a zoom lens of the so-called negative lead type in which a negative lens unit leads, as in the zoom lens according to the invention, if the refractive power of the negative first lens unit is strengthened, an advantage arises in reducing the diameter of a front lens member.

However, if the refractive power of the negative first lens unit is excessively strengthened, it becomes difficult to correct distortion, coma and curvature of field at the wide-angle end, in particular. In addition, it becomes difficult to secure a bright F-number at the telephoto end, because it becomes hard for the zoom lens to take a refractive power arrangement of the telephoto type at the telephoto end.

The condition (7) is set in view of the above reason. If the upper limit of the condition (7) is exceeded, it becomes difficult to reduce the size of the entire zoom lens. If the lower limit of the condition (7) is exceeded, it becomes difficult to correct distortion, coma and curvature of field at the wide-angle end, or it becomes difficult to secure a bright F-number at the telephoto end, because it becomes hard for the zoom lens to take a refractive power arrangement of the telephoto type at the telephoto end.

If, desirably, the first lens unit is made to comprise, in order from the object side to the image side, a negative lens of meniscus form having a convex surface facing the object side, a negative lens both lens surfaces of which are concave, and a positive lens of meniscus form having a convex surface facing the object side, it becomes possible to easily attain the above advantageous effect.

Further, according to the second embodiment, in order to attain the above-mentioned objective, the second lens unit of positive refractive power is made to have an appropriate lens construction. In the type of zoom lens according to the second embodiment, the second lens unit of positive refractive power is not only a main lens unit for the variation of magnification but also a lens unit which most greatly bears a positive refractive power of the entire zoom lens from the wide-angle end through the telephoto end, and, therefore, requires a relatively strong refractive power.

For that purpose, it is necessary to dispose a plurality of positive lenses in the second lens unit. However, if the number of positive lenses is excessively increased, the on-axial thickness of the second lens unit increases, so that the distance between the stop and the first lens unit becomes large. As a result, not only the second lens unit but also the first lens unit tends to become large in size.

In view of this, in the second embodiment, the second lens unit of positive refractive power is made to have such a simple construction that only two positive lens and one negative lens are disposed therein. In that construction, the one negative lens bears the role of correcting the various aberrations occurring in the two positive lenses, in particular, spherical aberration at the telephoto end.

The condition (8) is provided, in view of the above, for appropriately setting the focal length of the second lens unit suited for the lens construction of the second lens unit. If the upper limit of the condition (8) is exceeded, it becomes difficult to secure a required variable magnification ratio, or it becomes difficult to secure a bright F-number at the telephoto end, because it becomes hard for the zoom lens to take a refractive power arrangement of the telephoto type at the telephoto end. If the lower limit of the condition (8) is exceeded, it becomes difficult to correct spherical aberration at the telephoto end, in particular.

Further, according to the second embodiment, in order to attain the above-mentioned objective, the stop is made to be disposed at an appropriate position. In the zoom lens according to the second embodiment, at the telephoto end, such a refractive power arrangement is made that the first lens unit and the second lens unit are located close to each other to form a front lens group whose composite refractive power is positive, and, at a certain interval from the front lens group toward the image side, the third lens unit and the fourth lens unit are located close to each other to form a rear lens group whose composite refractive power is negative. In this refractive power arrangement, since an F-number light flux is converged by the front lens group, if the stop is disposed at a given interval from the front lens group toward the image side, the diameter of the stop can be made small. Accordingly, it is possible to prevent the size of the whole optical apparatus from increasing due to the increased size or complication of a mechanism of the stop.

On the other hand, at the wide-angle end, such a refractive power arrangement is made that the first lens unit is located as a front lens group of negative refractive power, and, at a certain interval from the front lens group toward the image side, the second lens group and the third lens group are located to close to each other to form an intermediate lens group whose composite refractive power is positive, and, further, at a certain interval from the intermediate lens group toward the image side, the fourth lens unit is located as a rear lens group of positive refractive power. In this refractive power arrangement, if the stop is disposed in the vicinity of the intermediate lens group, the diameter of a front lens member and the diameter of a rear lens member balance, so that an advantage arises in reducing the size of the entire zoom lens.

In the second embodiment, for the above-described reason, the stop is disposed in the vicinity of the third lens unit, thereby forming a construction advantageous for the reduction in size and cost of the whole optical apparatus.

In the second embodiment, desirably, it is preferred that the conditions (7) and (8) are limited to the following ranges:

$$1.2<|f1/fw|<1.4 \tag{7}'$$

$$0.9<f2/fw<1.0 \tag{8}'$$

While the zoom lens according to the second embodiment is realized by satisfying the above-described conditions, in order to further attain the shortening of the total length of the zoom lens while maintaining good optical performance, it is desirable to satisfy at least one of the following conditions.

(b-1) The stop is disposed on the object side of the third lens unit.

With the stop disposed on the object side of the third lens unit, it is possible to advantageously attain both the above-mentioned advantageous effect and the simplification of the structure of a lens barrel holding the third lens unit.

(b-2) The second lens unit and the fourth lens unit move in unison with each other during the variation of magnification.

If the second lens unit and the fourth lens unit are made to move in unison with each other during the variation of magnification, it is possible to advantageously simplify the structure of a lens barrel.

(b-3) The third lens unit comprises one positive lens and one negative lens, and satisfies the following condition:

$$1.5<|f3/fw|<3.0 \tag{9}$$

where f3 is a focal length of the third lens unit.

The condition (9) is provided for appropriately setting the focal length of the third lens unit. If the upper limit of the condition (9) is exceeded, it becomes difficult to set a composite refractive power of the third lens unit and the fourth lens unit at the telephoto end to a sufficient negative refractive power, or it becomes difficult to secure a bright F-number at the telephoto end, because it becomes hard for the zoom lens to take a refractive power arrangement of the telephoto type at the telephoto end. If the lower limit of the condition (9) is exceeded, it becomes difficult to correct, in particular, coma and distortion throughout the whole focal length range.

Desirably, it is preferred that the condition (9) is limited to the following range:

$$1.7<|f3/fw|<2.6 \tag{9}'$$

(b-4) The fourth lens unit comprises one positive lens and one negative lens, and satisfies the following condition:

$$2.5 < f4/fw < 8.0 \tag{10}$$

where f4 is a focal length of the fourth lens unit.

The condition (10) is provided for appropriately setting the focal length of the fourth lens unit. If the upper limit of the condition (10) is exceeded, it becomes difficult to correct, in particular, spherical aberration at the telephoto end. If the lower limit of the condition (10) is exceeded, it becomes difficult to correct negative distortion at the wide-angle end.

Desirably, it is preferred that the condition (10) is limited to the following range:

$$2.8 < f4/fw < 7.0 \tag{10}'$$

(b-5) The second lens unit has a cemented lens composed of a negative lens and a positive lens, and satisfies the following condition:

$$20 < v2p - v2n \tag{11}$$

where v2p is an Abbe number of a material of the positive lens of the cemented lens of the second lens unit, and v2n is an Abbe number of a material of the negative lens of the cemented lens of the second lens unit.

With a cemented lens composed of a negative lens and a positive lens disposed in the second lens unit, and the condition (11) satisfied, it becomes easy to correct well negative longitudinal chromatic aberration at the telephoto end.

The condition (11) is provided for defining Abbe numbers of the negative lens and the positive lens of the cemented lens. If the condition (11) is not satisfied, it becomes difficult to correct well negative longitudinal chromatic aberration at the telephoto end.

Desirably, it is preferred that the condition (11) is limited to the following range:

$$25 < v2p - v2n \tag{11}'$$

(b-6) The third lens unit has a cemented lens composed of a negative lens and a positive lens, and satisfies the following condition:

$$4.0 < v3n - v3p < 12.0 \tag{12}$$

$$0.05 < N3p - N3n < 0.20 \tag{13}$$

where v3n is an Abbe number of a material of the negative lens of the cemented lens of the third lens unit, v3p is an Abbe number of a material of the positive lens of the cemented lens of the third lens unit, N3p is a refractive index of the positive lens of the cemented lens of the third lens unit, and N3n is a refractive index of the negative lens of the cemented lens of the third lens unit.

With a cemented lens disposed in the third lens unit and the conditions (12) and (13) satisfied, it becomes easy to correct well chromatic aberration, spherical aberration and coma throughout the whole focal length range.

The condition (12) is provided for appropriately setting the Abbe numbers of the materials of the negative lens and the positive lens of the cemented lens of the third lens unit. If the upper limit of the condition (12) is exceeded, longitudinal chromatic aberration becomes over-corrected, so that it becomes difficult to correct well longitudinal chromatic aberration in the entire zoom lens by cancellation with longitudinal chromatic aberration remaining in the first lens unit and the second lens unit, in particular, at the telephoto end.

If the lower limit of the condition (12) is exceeded, longitudinal chromatic aberration becomes under-corrected, so that it becomes difficult to correct well longitudinal chromatic aberration at the wide-angle end.

The condition (13) is provided for appropriately setting the refractive indices of the materials of the negative lens and the positive lens of the cemented lens of the third lens unit. If the upper limit of the condition (13) is exceeded, a positive refractive power in the cementing surface of the cemented lens becomes too strong, so that it becomes difficult to maintain a negative refractive power of the whole third lens unit. As a result, it becomes difficult for the entire zoom lens to secure a sufficient variable magnification ratio. If the lower limit of the condition (13) is exceeded, a positive refractive power in the cementing surface of the cemented lens becomes too weak, so that it becomes difficult to cancel, with the cementing surface, coma occurring in the third lens unit.

Desirably, it is preferred that the conditions (12) and (13) are limited to the following ranges:

$$5.0 < v3n - v3p < 10.0 \tag{12}'$$

$$0.08 < N3p - N3n < 0.17 \tag{13}'$$

(b-7) The fourth lens unit has at least one aspheric surface.

With an aspheric surface applied to the fourth lens unit, it advantageously becomes easy to correct curvature of field and distortion at the wide-angle end and spherical aberration at the telephoto end.

Desirably, it is preferred that the aspheric surface is formed such that a negative refractive power thereof becomes progressively stronger according to a distance away from the optical axis.

(b-8) The fourth lens unit has a plastic aspheric lens.

With the aspheric surface applied to a plastic lens, an advantage arises in respect of manufacture.

Next, numerical data of the numerical examples 1 to 7 of the invention are shown. In the numerical data of the numerical examples 1 to 7, Ri denotes the radius of curvature of the i-th surface, when counted from the object side, Di denotes the i-th optical member thickness or air separation, when counted from the object side, Ni and vi respectively denote the refractive index and Abbe number of the i-th optical member, when counted from the object side.

The shape of an aspheric surface is expressed in the coordinates with an X axis in the optical axis direction (the direction in which light advances) and a Y axis in the direction perpendicular to the optical axis, by the following equation:

$$X = \frac{(1/R)Y^2}{1 + \sqrt{1 - (Y/R)^2}} + BY^4 + CY^6 + DY^8 + EY^{10}$$

where R is the radius of curvature of a central portion of a lens surface, and B, C, D and E are aspheric coefficients.

Further, the indication "e-X" means "$\times 10^{-X}$". The values of the factors in the above-mentioned conditions (3) to (13) for the numerical examples 1 to 7 are listed in Table-1.

Numerical Example 1:

| f = 28.90 – 86.90 | Fno = 3.85 – 5.88 | 2ω = 73.6° – 28.0° |
|---|---|---|
| R 1 = 40.020 | D 1 = 1.80 | N 1 = 1.622992  v 1 = 58.2 |
| R 2 = 18.658 | D 2 = 9.38 | |
| R 3 = –87.765 | D 3 = 1.60 | N 2 = 1.603112  v 2 = 60.6 |

-continued

| | | | |
|---|---|---|---|
| R 4 = 40.889 | D 4 = 0.15 | | |
| R 5 = 28.885 | D 5 = 2.70 | N 3 = 1.846660 | ν 3 = 23.8 |
| R 6 = 52.234 | D 6 = Variable | | |
| R 7 = 53.877 | D 7 = 1.95 | N 4 = 1.670029 | ν 4 = 47.2 |
| R 8 = −202.578 | D 8 = 0.15 | | |
| R 9 = 26.488 | D 9 = 1.00 | N 5 = 1.846660 | ν 5 = 23.8 |
| R10 = 15.343 | D10 = 5.16 | N 6 = 1.603112 | ν 6 = 60.6 |
| R11 = −108.654 | D11 = Variable | | |
| R12 = Stop | D12 = 1.62 | | |
| R13 = −65.732 | D13 = 0.80 | N 7 = 1.647689 | ν 7 = 33.8 |
| R14 = 13.285 | D14 = 2.77 | N 8 = 1.761821 | ν 8 = 26.5 |
| R15 = 42.673 | D15 = Variable | | |
| R16 = −126.063 | D16 = 1.00 | N 9 = 1.583060 | ν 9 = 30.2 |
| *R17 = −390.038 | D17 = 0.34 | | |
| R18 = −175.779 | D18 = 2.32 | N10 = 1.516330 | ν10 = 64.1 |
| R19 = −30.398 | D19 = Variable | | |
| R20 = Flare Cutter | | | |

*Aspheric Surface

| Variable | Focal Length | | |
|---|---|---|---|
| Separation | 28.90 | 50.07 | 86.90 |
| D 6 | 34.63 | 12.75 | 1.10 |
| D11 | 2.02 | 7.12 | 12.75 |
| D15 | 14.07 | 8.97 | 3.34 |
| D19 | 0.00 | 12.98 | 36.87 |

Aspheric Coefficients:

R17  B = 1.85409e-05  C = 1.98751e-08  D = 4.89571e-10
     E = −3.02884e-12

Numerical Example 2:

| f = 28.90 − 86.90 | Fno = 3.85 − 5.88 | 2ω = 73.6° − 28.0° |
|---|---|---|
| R 1 = 39.739 | D 1 = 1.80 | N 1 = 1.622992  ν 1 = 58.2 |
| R 2 = 18.639 | D 2 = 9.45 | |
| R 3 = −87.988 | D 3 = 1.60 | N 2 = 1.603112  ν 2 = 60.6 |
| R 4 = 41.058 | D 4 = 0.15 | |
| R 5 = 28.801 | D 5 = 2.70 | N 3 = 1.846660  ν 3 = 23.8 |
| R 6 = 51.498 | D 6 = Variable | |
| R 7 = 53.227 | D 7 = 1.95 | N 4 = 1.670029  ν 4 = 47.2 |
| R 8 = −205.057 | D 8 = 0.15 | |
| R 9 = 26.663 | D 9 = 1.00 | N 5 = 1.846660  ν 5 = 23.8 |
| R10 = 15.329 | D10 = 5.16 | N 6 = 1.603112  ν 6 = 60.6 |
| R11 = −107.661 | D11 = Variable | |
| R12 = Stop | D12 = 1.83 | |
| R13 = −65.510 | D13 = 0.80 | N 7 = 1.639799  ν 7 = 34.5 |
| R14 = 13.483 | D14 = 2.73 | N 8 = 1.761821  ν 8 = 26.5 |
| R15 = 41.372 | D15 = Variable | |
| R16 = −133.800 | D16 = 1.00 | N 9 = 1.583060  ν 9 = 30.2 |
| *R17 = −407.135 | D17 = 0.34 | |
| R18 = −191.639 | D18 = 2.39 | N10 = 1.487490  ν10 = 70.2 |
| R19 = −29.551 | D19 = Variable | |
| R20 = Flare Cutter | | |

*Aspheric Surface

| Variable | Focal Length | | |
|---|---|---|---|
| Separation | 28.90 | 49.99 | 86.90 |
| D 6 | 34.65 | 12.80 | 1.10 |
| D11 | 2.02 | 7.15 | 12.82 |
| D15 | 14.16 | 9.04 | 3.37 |
| D19 | 0.00 | 12.91 | 36.87 |

Aspheric Coefficients:

R17  B = 1.84446e-05  C = 2.19637e-08  D = 3.96874e-10
     E = −2.39010e-12

Numerical Example 3:

| f = 28.91 − 86.87 | Fno = 4.16 − 5.88 | 2ω = 73.6° − 28.0° |
|---|---|---|
| R 1 = 43.239 | D 1 = 1.80 | N 1 = 1.666718  ν 1 = 48.3 |
| R 2 = 19.880 | D 2 = 9.03 | |
| R 3 = −78.719 | D 3 = 1.60 | N 2 = 1.622992  ν 2 = 58.2 |
| R 4 = 55.339 | D 4 = 0.15 | |
| R 5 = 32.137 | D 5 = 2.71 | N 3 = 1.846660  ν 3 = 23.8 |
| R 6 = 57.907 | D 6 = Variable | |
| R 7 = 39.559 | D 7 = 1.00 | N 4 = 1.846660  ν 4 = 23.8 |
| R 8 = 21.679 | D 8 = 4.14 | N 5 = 1.603112  ν 5 = 60.6 |
| R 9 = −77.549 | D 9 = 0.10 | |
| R10 = 34.078 | D10 = 2.48 | N 6 = 1.622992  ν 6 = 58.2 |
| R11 = −507.551 | D11 = Variable | |
| R12 = Stop | D12 = 1.72 | |
| R13 = −85.718 | D13 = 0.80 | N 7 = 1.666718  ν 7 = 48.3 |
| R14 = 11.985 | D14 = 2.87 | N 8 = 1.762001  ν 8 = 40.1 |
| R15 = 49.521 | D15 = Variable | |
| R16 = −110.546 | D16 = 1.00 | N 9 = 1.583060  ν 9 = 30.2 |
| *R17 = 113.098 | D17 = 0.79 | |
| R18 = −185.957 | D18 = 2.27 | N10 = 1.516330  ν10 = 64.1 |
| R19 = −28.408 | D19 = Variable | |
| R20 = Flare Cutter | | |

*Aspheric Surface

| Variable | Focal Length | | |
|---|---|---|---|
| Separation | 28.91 | 50.03 | 86.87 |
| D 6 | 38.34 | 14.02 | 0.97 |
| D11 | 1.89 | 8.09 | 14.94 |
| D15 | 15.04 | 8.84 | 1.99 |
| D19 | 0.00 | 11.61 | 34.15 |

Aspheric Coefficients:

R17  B = 2.38066e-05  C = 1.49850e-07  D = −1.89543e-09
     E = 1.00939e-11

Numerical Example 4:

| f = 28.90 – 86.89 | Fno = 3.98 – 5.88 | 2ω = 73.6° – 28.0° |
|---|---|---|
| R 1 = 43.859 | D 1 = 1.80 | N 1 = 1.622992  ν 1 = 58.2 |
| R 2 = 18.850 | D 2 = 8.98 | |
| R 3 = −81.993 | D 3 = 1.60 | N 2 = 1.603112  ν 2 = 60.6 |
| R 4 = 55.710 | D 4 = 0.15 | |
| R 5 = 29.393 | D 5 = 2.55 | N 3 = 1.846660  ν 3 = 23.8 |
| R 6 = 47.573 | D 6 = Variable | |
| R 7 = 56.647 | D 7 = 2.08 | N 4 = 1.701536  ν 4 = 41.2 |
| R 8 = −190.859 | D 8 = 0.10 | |
| R 9 = 27.900 | D 9 = 1.00 | N 5 = 1.846660  ν 5 = 23.8 |
| R10 = 15.524 | D10 = 4.72 | N 6 = 1.603112  ν 6 = 60.6 |
| R11 = −129.021 | D11 = Variable | |
| R12 = Stop | D12 = 1.74 | |
| R13 = −81.635 | D13 = 0.80 | N 7 = 1.672700  ν 7 = 32.1 |
| R14 = 14.073 | D14 = 2.61 | N 8 = 1.805181  ν 8 = 25.4 |
| R15 = 48.771 | D15 = Variable | |
| R16 = −139.337 | D16 = 1.00 | N 9 = 1.583060  ν 9 = 30.2 |
| *R17 = 264.589 | D17 = 0.66 | |
| R18 = −163.311 | D18 = 2.45 | N10 = 1.516330  ν10 = 64.1 |
| R19 = −7.550 | D19 = Variable | |
| R20 = Flare Cutter | | |

*Aspheric Surface

| Variable | Focal Length | | |
|---|---|---|---|
| Separation | 28.90 | 50.08 | 86.89 |
| D 6 | 35.70 | 13.01 | 0.99 |
| D11 | 1.68 | 8.12 | 14.99 |
| D15 | 15.37 | 8.93 | 2.05 |
| D19 | 0.00 | 12.75 | 36.95 |

Aspheric Coefficients:

R17  B = 1.94921e-05   C = 1.603327e-08   D = 3.08711e-10
     E = −2.21116e-12

Numerical Example 5:

| f = 28.90 – 86.89 | Fno = 4.00 – 5.88 | 2ω = 73.6° – 28.0° |
|---|---|---|
| R 1 = 35.198 | D 1 = 1.80 | N 1 = 1.723420  ν 1 = 38.0 |
| R 2 = 18.688 | D 2 = 9.91 | |
| R 3 = −75.702 | D 3 = 1.60 | N 2 = 1.622992  ν 2 = 58.2 |
| R 4 = 42.141 | D 4 = 0.90 | |
| R 5 = 31.598 | D 5 = 2.97 | N 3 = 1.846660  ν 3 = 23.8 |
| R 6 = 71.860 | D 6 = Variable | |
| R 7 = 43.415 | D 7 = 2.30 | N 4 = 1.658441  ν 4 = 50.9 |
| R 8 = −241.234 | D 8 = 0.10 | |
| R 9 = 27.190 | D 9 = 1.00 | N 5 = 1.846660  ν 5 = 23.8 |
| R10 = 15.034 | D10 = 5.65 | N 6 = 1.570989  ν 6 = 50.8 |
| R11 = −97.682 | D11 = Variable | |
| R12 = Stop | D12 = 1.77 | |
| R13 = −74.227 | D13 = 0.80 | N 7 = 1.688931  ν 7 = 31.1 |
| R14 = 14.230 | D14 = 2.47 | N 8 = 1.805181  ν 8 = 25.4 |
| R15 = 58.520 | D15 = Variable | |
| R16 = 3775.366 | D16 = 1.00 | N 9 = 1.583060  ν 9 = 30.2 |
| *R17 = 54.758 | D17 = 1.13 | |
| R18 = −120.938 | D18 = 2.30 | N10 = 1.516330  ν10 = 64.1 |
| R19 = −26.355 | D19 = Variable | |
| R20 = Flare Cutter | | |

*Aspheric Surface

| Variable | Focal Length | | |
|---|---|---|---|
| Separation | 28.90 | 50.59 | 86.89 |
| D 6 | 38.01 | 13.73 | 1.09 |
| D11 | 1.55 | 7.20 | 13.24 |
| D15 | 12.71 | 7.06 | 1.02 |
| D19 | 0.00 | 13.30 | 36.95 |

Aspheric Coefficients:

R17  B = 2.14995e-05   C = −1.88071e-08   D = 6.82596e-10
     E = −4.81611e-12

Numerical Example 6:

| f = 28.90 – 86.89 | Fno = 3.83 – 5.88 | 2ω = 73.6° – 28.0° |
|---|---|---|
| R 1 = 37.748 | D 1 = 1.80 | N 1 = 1.622992  ν 1 = 58.2 |
| R 2 = 18.350 | D 2 = 9.59 | |
| R 3 = −90.750 | D 3 = 1.60 | N 2 = 1.622992  ν 2 = 58.2 |
| R 4 = 43.103 | D 4 = 0.15 | |
| R 5 = 28.478 | D 5 = 2.62 | N 3 = 1.846660  ν 3 = 23.8 |
| R 6 = 48 635 | D 6 = Variable | |
| R 7 = 50.008 | D 7 = 2.00 | N 4 = 1.701536  ν 4 = 41.2 |
| R 8 = −267.513 | D 8 = 0.10 | |
| R 9 = 26.915 | D 9 = 1.00 | N 5 = 1.846660  ν 5 = 23.8 |
| R10 = 15.023 | D10 = 5.26 | N 6 = 1.603112  ν 6 = 60.6 |
| R11 = −101.063 | D11 = Variable | |
| R12 = Stop | D12 = 1.80 | |
| R13 = −68.910 | D13 = 0.80 | N 7 = 1.688931  ν 7 = 31.1 |
| R14 = 13.828 | D14 = 2.64 | N 8 = 1.846660  ν 8 = 23.8 |
| R15 = 39.654 | D15 = Variable | |
| R16 = −90.382 | D16 = 1.00 | N 9 = 1.583060  ν 9 = 30.2 |
| *R17 = −205.313 | D17 = 0.40 | |
| R18 = −190.913 | D18 = 2.42 | N10 = 1.516330  ν10 = 64.1 |
| R19 = −29.325 | D19 = Variable | |
| R20 = Flare Cutter | | |

*Aspheric Surface

| Variable | Focal Length | | |
|---|---|---|---|
| Separation | 28.90 | 50.02 | 86.89 |
| D 6 | 34.38 | 12.71 | 1.09 |
| D11 | 2.00 | 6.87 | 12.46 |
| D15 | 14.09 | 9.21 | 3.62 |
| D19 | 0.00 | 13.06 | 36.80 |

Aspheric Coefficients:

R17  B = 1.91256e-05   C = 4.84357e-08   D = −2.85693e-10
     E = 1.98932e-12

Numerical Example 7:

| f = 28.90 – 82.00 | Fno = 4.13 – 5.88 | 2ω = 73.6° – 29.6° | |
|---|---|---|---|
| R 1 = 44.569 | D 1 = 1.80 | N 1 = 1.666718 | ν 1 = 48.3 |
| R 2 = 19.439 | D 2 = 8.76 | | |
| R 3 = –83.196 | D 3 = 1.60 | N 2 = 1.622992 | ν 2 = 58.2 |
| R 4 = 53.624 | D 4 = 0.15 | | |
| R 5 = 31.347 | D 5 = 2.81 | N 3 = 1.846660 | ν 3 = 23.8 |
| R 6 = 59.986 | D 6 = Variable | | |
| R 7 = 37.347 | D 7 = 1.00 | N 4 = 1.846660 | ν 4 = 23.8 |
| R 8 = 20.840 | D 8 = 3.82 | N 5 = 1.603112 | ν 5 = 60.6 |
| R 9 = –109.250 | D 9 = 0.10 | | |
| R10 = 33.997 | D10 = 2.42 | N 6 = 1.622992 | ν 6 = 58.2 |
| R11 = –289.876 | D11 = Variable | | |
| R12 = Stop | D12 = 1.71 | | |
| R13 –89.465 | D13 = 0.80 | N 7 = 1.666718 | ν 7 = 48.3 |
| R14 = 11.810 | D14 = 2.95 | N 8 = 1.762001 | ν 8 = 40.1 |
| R15 = 54.376 | D15 = Variable | | |
| R16 = –81.002 | D16 = 1.00 | N 9 = 1.583060 | ν 9 = 30.2 |
| *R17 = 148.189 | D17 = 0.72 | | |
| R18 = –129.191 | D18 = 2.18 | N10 = 1.516330 | ν10 = 64.1 |
| R19 = –25.978 | D19 = Variable | | |
| R20 = Flare Cutter | | | |

*Aspheric Surface

| Variable | Focal Length | | |
|---|---|---|---|
| Separation | 28.90 | 49.50 | 82.00 |
| D 6 | 35.36 | 12.77 | 1.10 |
| D11 | 1.86 | 7.37 | 12.74 |
| D15 | 12.77 | 7.27 | 1.90 |
| D19 | 0.00 | 12.64 | 34.15 |

Aspheric Coefficients:

R17  B = 2.78750e-05   C = 1.33153e-07   D = –1.58437e-09
     E = 9.93954e-12

Figure 29:
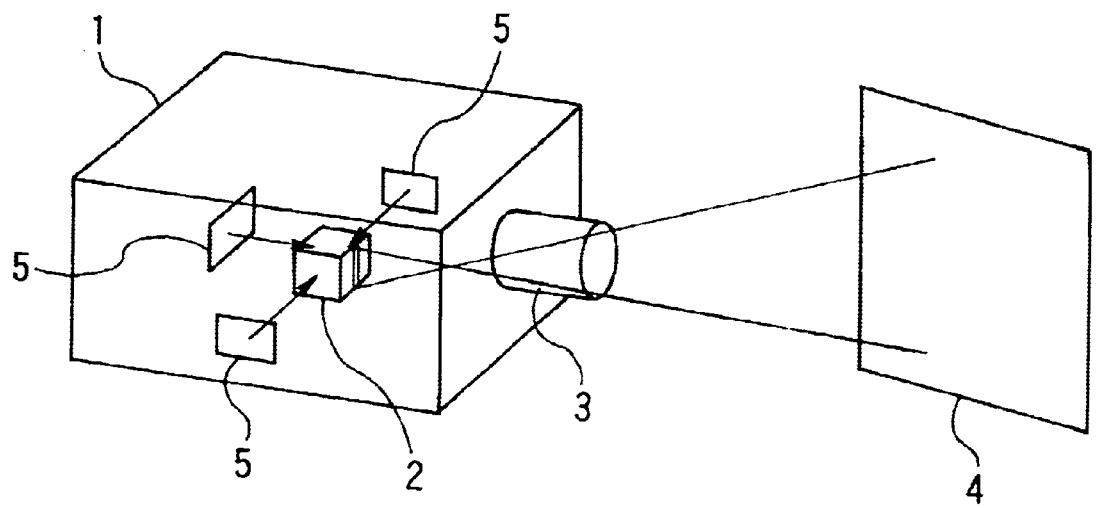
FIG. 29 is a schematic diagram showing a liquid crystal projector in which the zoom lens according to the invention is used.
Figure 30:
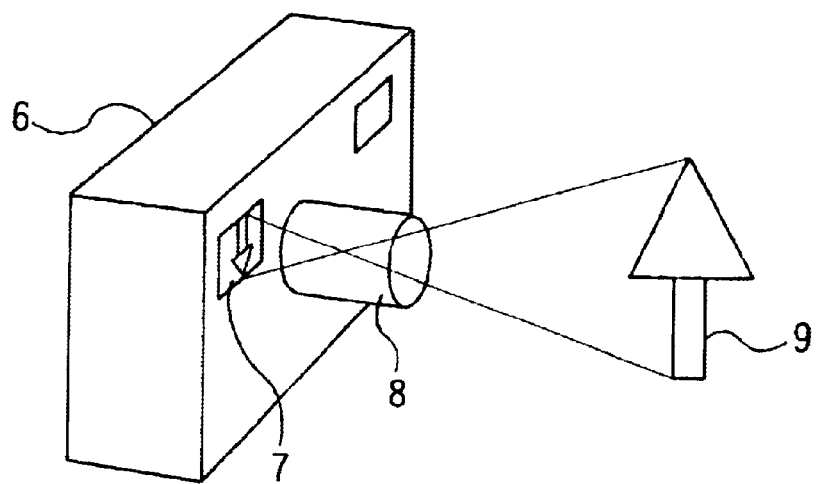
FIG. 30 is a schematic diagram showing a camera in which the zoom lens according to the invention is used.

In the foregoing, the zoom lens according to the invention has been described. Next, in FIG. 29, there is shown a schematic diagram illustrating a projector (image projection apparatus) in which the zoom lens according to the invention is used. In the case of FIG. 29, a liquid crystal projector 1 of the three-plate type is taken as an example of the projector. In the liquid crystal projector 1, images formed by three image forming elements 5 are combined into a projection image by a prism 2, and the projection image is projected onto a screen 4 or the like by a projection lens 3 which is the zoom lens according to the invention. Of course, the zoom lens according to the invention may be used in apparatuses other than the projector, and the liquid crystal projector may be of the single-plate type. Further, in FIG. 30, there is shown a schematic diagram illustrating a camera (image pickup apparatus) 6 in which the zoom lens according to the invention is used. In the camera 6, light from an object 9 is imaged on a photosensitive member (film, a CCD or the like) 7 inside the camera 6 by an image pickup lens 8 which is the zoom lens according to the invention. Of course, the zoom lens according to the invention may be used in image pickup apparatuses other than the camera, such as a video camera.

I claim:

1. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35 < v11n < 65$, and (b) when $35 < v11n < 52$, $-0.013\ v11n + 2.19 < N11n < -0.005\ v11n + 1.92$, when $52 < v11n < 60$, $1.5 < N11n < -0.005\ v11n + 1.92$, when $60 < v11n < 65$, $1.5 < N11n < -0.022\ v11n + 2.94$, where v11n is an Abbe number of a material of said negative lens located on the most object side of said first lens unit, and N11n is a refractive index of the material of said negative lens located on the most object side of said first lens unit, wherein said first lens unit has a second negative lens other than said negative lens located on the most object side thereof, and said second negative lens satisfies the following conditions:

(c) $35 < v12n < 65$, and (d) when $35 < v12n < 52$,

TABLE 1

| | Numerical Example | | | | | | |
|---|---|---|---|---|---|---|---|
| Condition | 1 | 2 | 3 | 4 | 5 | 6 | 7 |
| (3) \|f1/fw\| | 1.275 | 1.275 | 1.322 | 1.299 | 1.323 | 1.270 | 1.334 |
| (4) f2/fw | 0.944 | 0.945 | 0.949 | 0.992 | 0.968 | 0.933 | 0.962 |
| (5) \|f3/fw\| | 1.803 | 1.803 | 2.270 | 2.256 | 2.320 | 1.735 | 2.581 |
| (6) f4/fw | 3.107 | 3.081 | 6.297 | 3.607 | 6.348 | 2.992 | 6.453 |
| (7) \|f1/fw\| | 1.275 | 1.275 | 1.322 | 1.299 | 1.323 | 1.270 | 1.334 |
| (8) f2/fw | 0.944 | 0.945 | 0.949 | 0.992 | 0.968 | 0.933 | 0.962 |
| (9) \|f3/fw\| | 1.803 | 1.803 | 2.270 | 2.256 | 2.320 | 1.735 | 2.581 |
| (10) f4/fw | 3.107 | 3.081 | 6.297 | 3.607 | 6.348 | 2.992 | 6.453 |
| (11) v2p-v2n | 36.860 | 36.860 | 36.860 | 36.860 | 27.020 | 36.860 | 36.860 |
| (12) v3n-v3p | 7.270 | 7.940 | 8.220 | 6.680 | 5.650 | 7.290 | 8.220 |
| (13) N3p-N3n | 0.114 | 0.122 | 0.095 | 0.132 | 0.116 | 0.158 | 0.095 |

$$-0.013\ v12n+2.19<N12n<-0.005\ v12n+1.92,$$

when $52<v12n<60$, $$1.5<N12n<-0.005\ v12n+1.92,$$

when $60<v12n<65$, $$1.5<N12n<-0.022\ v12n+2.94,$$

where v12n is an Abbe number of a material of said second negative lens of said first lens unit, and N12n is a refractive index of the material of said second negative lens of said first lens unit, wherein the separation between adjacent lens units varies during zooming, and wherein no lens is present between (a) said negative lens located on the most object side of said first lens unit and (b) said second negative lens.

2. A zoom lens according to claim 1, wherein said zoom lens becomes, at a telephoto end, a telephoto type in which a plurality of lens units are divided into a lens group on the object side composed of at least one lens unit having a positive refractive power and a lens group on the image side composed of at least one lens unit having a negative refractive power.

3. A zoom lens according to claim 1, wherein said zoom lens satisfies the following condition:

$$0.9<|f1/fw|<1.8$$

where f1 is a focal length of said first lens unit, and fw is a focal length of said zoom lens in a wide-angle end.

4. A zoom lens according to claim 3, wherein $1.2<|f1/fw|<1.4$.

5. A zoom lens according to claim 1, wherein said first lens unit comprises, in order from the object side to the image side, a negative lens of meniscus form having a convex surface facing the object side, a negative lens, and a positive lens of meniscus form having a convex surface facing the object side.

6. A zoom lens according to claim 1, wherein said second lens unit and said fourth lens unit move in unison with each other during variation of magnification.

7. A zoom lens according to claim 1, wherein said zoom lens satisfies the following conditions:

$$0.65<f2/fw<1.3$$

$$1.2<|f3/fw|<3.4$$

where f2 and f3 are focal lengths of said second lens unit and said third lens unit, respectively, and fw is a focal length of said zoom lens in a wide-angle end.

8. A zoom lens according to claim 7, wherein $0.9<f2/fw<1.0$.

9. A zoom lens according to claim 1, wherein said zoom lens consists of said first to fourth lens units, and satisfies the following condition:

$$2.1<f4/fw<8.5$$

where f4 is a focal length of said fourth lens unit, and fw is a focal length of said zoom lens in a wide-angle end.

10. A zoom lens according to claim 1, wherein said second lens unit comprises two positive lenses and one negative lens.

11. A zoom lens according to claim 1, wherein said third lens unit comprises a cemented lens composed of a negative lens and a positive lens.

12. A zoom lens according to claim 1, wherein said fourth lens unit comprises a negative lens and a positive lens, and has at least one aspheric surface.

13. A zoom lens according to claim 1, wherein said second lens unit comprises one positive lens and a positive cemented lens composed of a negative lens and a positive lens.

14. A zoom lens according to claim 1, wherein said fourth lens unit has a plastic aspheric lens.

15. A zoom lens according to claim 1, wherein said second lens unit comprises one positive lens and a positive cemented lens composed of a negative lens and a positive lens, said third lens unit comprises a negative lens and a positive lens, and said fourth lens unit comprises a negative lens and a positive lens, and has a plastic aspheric lens.

16. An image pickup apparatus comprising a zoom lens according to claim 1, a photosensitive member, and means for supporting said zoom lens and said photosensitive member.

17. An image projection apparatus comprising a zoom lens according to claim 1, a light source, and an image forming element, and arranged to project an image.

18. A zoom lens according to claim 1, wherein the following conditions are satisfied:

$$1.1<|f1/fw|<1.4$$

$$0.8<|f2/fw|<1.1$$

where f1 and f2 are focal lengths of said first lens unit and said second lens unit, respectively, and fw is a focal length of said zoom lens in a wide-angle end.

19. A zoom lens according to claim 1, wherein the following conditions are satisfied:

(a) $37<v11n<65$, and (b) when $35<v11n<52$, $-0.008\ v11n+2.02<N11n<-0.005\ v11n+1.90$ when $52<v11n<60$, $-0.008\ v11n+2.02<N11n<-0.005\ v11n+1.92$ when $60<v11n<65$, $-0.008\ v11n+2.02<N11n<-0.022\ v11n+2.94$.

20. A zoom lens according to claim 19, wherein $1.15<|f1/fw|<1.45$ where f1 is the focal length of said first lens unit and fw is the focal length of said zoom lens at the wide-angle end.

21. A zoom lens according to claim 1, wherein the following conditions are satisfied:

$$0.84<f2/fw<1.1$$

$$1.65<|f3/fw|<2.8$$

$$2.8<f4/fw<7.1$$

where f2 is the focal length of said second lens unit, f3 is the focal length of said third lens unit, f4 is the focal length of said fourth lens unit, and fw is the focal length of said zoom lens in the wide-angle end.

22. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35<\nu 11n<65$, and (b) when $35<\nu 11n<52$, $-0.013\ \nu 11n+2.19<N11n<-0.005\ \nu 11n+1.92$, when $52<\nu 11n<60$, $1.5<N11n<-0.005\ \nu 11n+1.92$, when $60<\nu 11n<65$, $1.5<N11n<-0.022\ \nu 11n+2.94$, where $\nu 11n$ is an Abbe number of a material of said negative lens located on the most object side of said first lens unit, and $N11n$ is a refractive index of the material of said negative lens located on the most object side of said first lens unit, wherein said first lens unit has a second negative lens other than said negative lens located on the most object side thereof, and said second negative lens satisfies the following conditions:

(c) $35<\nu 12n<65$, and (d) when $35<\nu 12n<52$, $-0.013\ \nu 12n+2.19<N12n<-0.005\ \nu 12n+1.92$, when $52<\nu 12n<60$, $1.5<N12n<-0.005\ \nu 12n+1.92$, when $60<\nu 12n<65$, $1.5<N12n<-0.022\ \nu 12n+2.94$, where $\nu 12n$ is an Abbe number of a material of said second negative lens of said first lens unit, and $N12n$ is a refractive index of the material of said second negative lens of said first lens unit, wherein the separation between adjacent lens units varies during zooming, and wherein, during variation of magnification from a wide-angle end to a telephoto end, said first lens unit moves with a locus convex toward the image side, said second lens unit moves toward the object side in such a way as to decrease a separation between said first lens unit and said second lens unit, said third lens unit moves toward the object side in such a way as to increase a separation between said second lens unit and said third lens unit, and said fourth lens unit moves toward the object side in such a way as to decrease a separation between said third lens unit and said fourth lens unit.

23. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35<\nu 11n<65$, and (b) when $35<\nu 11n<52$, $-0.013\ \nu 11n+2.19<N11n<-0.005\ \nu 11n+1.92$, when $52<\nu 11n<60$, $1.5<N11n<-0.005\ \nu 11n+1.92$, when $60<\nu 11n<65$, $1.5<N11n<-0.022\ \nu 11n+2.94$, where $\nu 11n$ is an Abbe number of a material of said negative lens located on the most object side of said first lens unit, and $N11n$ is a refractive index of the material of said negative lens located on the most object side of said first lens unit, wherein said second lens unit and said fourth lens unit move in unison with each other during variation of magnification, and wherein the separation between adjacent lens units varies during zooming.

24. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35<\nu 11n<65$, and (b) when $35<\nu 11n<52$, $-0.013\ \nu 11n+2.19<N11n<-0.005\ \nu 11n+1.92$, when $52<\nu 11n<60$, $1.5<N11n<-0.005\ \nu 11n+1.92$, when $60<\nu 11n<65$, $1.5<N11n<-0.022\ \nu 11n+2.94$, where $\nu 11n$ is an Abbe number of a material of said negative lens located on the most object side of said first lens unit, and $N11n$ is a refractive index of the material of said negative lens located on the most object side of said first lens unit, wherein said fourth lens unit comprises a negative lens and a positive lens, and has at least one aspheric surface, and wherein the separation between adjacent lens units varies during zooming.

25. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35<\nu 11n<65$, and (b) when $35<\nu 11n<52$, $-0.013\ \nu 11n+2.19<N11n<-0.005\ \nu 11n+1.92$, when $52<\nu 11n<60$, $1.5<N11n<-0.005\ \nu 11n+1.92$, when $60<\nu 11n<65$, $1.5<N11n<-0.022\ \nu 11n+2.94$, where $\nu 11n$ is an Abbe number of a material of said negative lens located on the most object side of said first lens unit, and N11n is a refractive index of the material of said negative lens located on the most object side of said first lens unit, wherein said fourth lens unit has a plastic aspheric lens, and wherein the separation between adjacent lens units varies during zooming.

26. A zoom lens according to claim 25, wherein said first lens unit has a second negative lens other than said negative lens located on the most object side thereof, and said second negative lens satisfies the following conditions:

(c) $35 < v12n < 65$, and (d) when $35 < v12n < 52$, $-0.013\ v12n + 2.19 < N12n < -0.005\ v12n + 1.92$, when $52 < v12n < 60$, $1.5 < N12n < -0.005\ v12n + 1.92$, when $60 < v12n < 65$, $1.5 < N12n < -0.022\ v12n + 2.94$, where v12n is an Abbe number of a material of said second negative lens of said first lens unit, and N12n is a refractive index of the material of said second negative lens of said first lens unit.

27. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35 < v11n < 65$, and (b) when $35 < v11n < 52$, $-0.013\ v11n + 2.19 < N11n < -0.005\ v11n + 1.92$, when $52 < v11n < 60$, $1.5 < N11n < -0.005\ v11n + 1.92$, when $60 < v11n < 65$, $1.5 < N11n < -0.022\ v11n + 2.94$, where v11n is an Abbe number of a material of said negative lens located on the most object side of said first lens unit, and N11n is a refractive index of the material of said negative lens located on the most object side of said first lens unit, wherein said second lens unit comprises one positive lens and a positive cemented lens composed of a negative lens and a positive lens, said third lens unit comprises a negative lens and a positive lens, and said fourth lens unit comprises a negative lens and a positive lens, and has a plastic aspheric lens, and wherein the separation between adjacent lens units varies during zooming.

28. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35 < v11n < 65$, and (b) when $35 < v11n < 52$, $-0.013\ v11n + 2.19 < N11n < -0.005\ v11n + 1.92$, when $52 < v11n < 60$, $1.5 < N11n < -0.005\ v11n + 1.92$, when $60 < v11n < 65$, $1.5 < N11n < -0.022\ v11n + 2.94$, where v11n is an Abbe number of a material of said negative lens located on the most object side of said first lens unit, and N11n is a refractive index of the material of said negative lens located on the most object side of said first lens unit, wherein said first lens unit has two negative lenses at the most object side, and moves during variation of magnification, and wherein the separation between adjacent lens units varies during zooming.

29. A zoom lens comprising, in order from an object side to an image side, a first lens unit of negative refractive power, a second lens unit of positive refractive power, a third lens unit of negative refractive power, and a fourth lens unit of positive refractive power, wherein said first lens unit has a negative lens located on the most object side thereof, and said negative lens located on the most object side of said first lens unit satisfies the following conditions:

(a) $35 < v11n < 65$, and (b) when $35 < v11n < 52$, $-0.013\ v11n + 2.19 < N11n < -0.005\ v11n + 1.92$, when $52 < v11n < 60$, $1.5 < N11n < -0.005\ v11n + 1.92$, when $60 < v11n < 65$, $1.5 < N11n < -0.022\ v11n + 2.94$, where v11n is an Abbe number of a material of said negative lens located on the most object side of said first lens unit, and N11n is a refractive index of the material of said negative lens located on the most object side of said first lens unit, wherein said first lens unit comprises three lenses including two negative lenses at the most object side, and wherein the separation between adjacent lens units varies during zooming.

* * * * *

UNITED STATES PATENT AND TRADEMARK OFFICE
CERTIFICATE OF CORRECTION

PATENT NO. : 6,710,931 B1
DATED : March 23, 2004
INVENTOR(S) : Makoto Misaka

It is certified that error appears in the above-identified patent and that said Letters Patent is hereby corrected as shown below:

Column 1,
Line 43, "a" should be deleted.

Column 3,
Line 34, "said" should read -- side --.

Column 5,
Line 14, "DRAWING" should read -- DRAWINGS --.

Column 6,
Line 1, "a" should be deleted.

Column 7,
Line 32, "aberration a" should read -- aberration --.
Line 37, "m" should be deleted.

Column 11,
Line 9, "a" should be deleted.
Line 42, "positive lens" should read -- positive lenses --.

Column 13,
Line 35, "positive lens" should read -- positive lenses --.

Column 17,
Line 13, "D12 = 1.62" should read -- D12 =1.82 --.

Column 19,
Line 41, "C = 1.603327e-08" should read -- C = 1.60327e-08 --.

Column 20,
Line 35, "R6 = 48 635" should read -- R6 = 48.635 --.

UNITED STATES PATENT AND TRADEMARK OFFICE
CERTIFICATE OF CORRECTION

PATENT NO. : 6,710,931 B1
DATED : March 23, 2004
INVENTOR(S) : Makoto Misaka

It is certified that error appears in the above-identified patent and that said Letters Patent is hereby corrected as shown below:

Column 21,
Line 20, "R13 -89.465" should read -- R13 = -89.465 --.

Column 24,
Line 46, "f1is" should read -- f1 is --.

Signed and Sealed this

Twenty-third Day of November, 2004

JON W. DUDAS
*Director of the United States Patent and Trademark Office*